(12) United States Patent
Curiel

(10) Patent No.: US 7,735,318 B1
(45) Date of Patent: Jun. 15, 2010

(54) METHOD AND APPARATUS FOR USING DENSITY CHANGE TO CREATE MOVEMENT

(76) Inventor: Gabriel Curiel, Paseo del Lago 1003, Campestre la Rosita, Torreon, Coahuila (MX) CP 27250

( * ) Notice: Subject to any disclaimer, the term of this patent is extended or adjusted under 35 U.S.C. 154(b) by 269 days.

(21) Appl. No.: 11/787,821

(22) Filed: Apr. 18, 2007

Related U.S. Application Data

(60) Provisional application No. 60/794,467, filed on Apr. 22, 2006.

(51) Int. Cl.
*F03C 1/00* (2006.01)

(52) U.S. Cl. ............................................ 60/495; 60/496

(58) Field of Classification Search ............ 60/495–496
See application file for complete search history.

(56) References Cited

U.S. PATENT DOCUMENTS

| | | | | |
|---|---|---|---|---|
| 4,674,281 A * | 6/1987 | Kim et al. | ...................... | 60/496 |
| 4,805,406 A * | 2/1989 | Grsetic | ........................ | 60/496 |
| 4,981,015 A * | 1/1991 | Simpson | ...................... | 60/496 |
| 6,964,165 B2 * | 11/2005 | Uhl et al. | ...................... | 60/495 |
| 7,216,483 B2 * | 5/2007 | Takeuchi | ...................... | 60/495 |
| 2004/0093863 A1 * | 5/2004 | Huang | .......................... | 60/495 |

OTHER PUBLICATIONS

Angel Guerra, "Estrategias evolutivas de los cefalópodos", Investigación y Ciencia (Spanish Edition of Scientific American), Apr. 2006, No. 355, pp. 50-59. published in Mexico and is written in Spanish.

Escala Magazine, The official in-flight magazine of AeroMexico airlines. Undated. p. 13. Photo of a person flying on a hot air balloon (1 page).

Miguel Breceda Lapeyre, "Agua y energía Cinco relaciones para estudiar este binomio", Teorema Ambiental magazine, Feb.-Mar. 2007, pp. 24-32.

Marc Boada, "Cristales de hielo en una célula convectiva", Investigación y Ciencia (Spanish Edition of Scientific American), Nov. 2005, No. 350, pp. 85-87.

Mundo Submarino—Enciclopedia Cousteau—Los tesoros de los océanos. "La energia de las mareas", Urbion-Hyspamerica. p. 43; "'Molinos de viento' en el Gulf Stream" 2 page numbers unknown, vol. 18, 1981.

Domenico Laurenza, Mario Taddei, Edoardo Zanon Eds., "Atlas Ilustrado de Las Máquinas de Leonardo—Secretors invenciones en los Códices da Vinci", Susaeta ediciones. Madrid, 2003, pp. 131-133.

(Continued)

*Primary Examiner*—Hoang M Nguyen
(74) *Attorney, Agent, or Firm*—Gordon G. Waggett, P.C.

(57) ABSTRACT

More specifically, the present invention is directed to apparatus and methodologies that take advantage of the movement produced by a body when it changes density in relation to the ambient environment surrounding the body in order to translate such movement into the generation of electricity or torque to move machinery or other processes requiring a driving force. The present invention addresses the need to harness a change in density between two substances to create rotational movement, or torque, that can be harnessed for any number of useful purposes, such as, generation of electricity, movement of pistons, operation of pumps used for any liquid, such as water or petroleum, conveyors, etc. The present invention also takes advantage of the combination of opposed natural forces, such as gravity and hydrostatic pressure, to achieve such movement.

20 Claims, 11 Drawing Sheets

OTHER PUBLICATIONS

Gian Carlo Delgado Ramos, "Nanotecnologia: avances y retos", Ciencia y Desarrollo, Apr. 2007, vol. 33, No. 206, pp. 19-21.

Elena C. Gaua, "Vejiga natatoria", Pececito; A Coruña, Espana. Undated. One page. This article is believed to have been published in Mexico and is written in Spanish.

Alberto Dominguez Escoda, Antonio Leon Gavira, Yurena Lorenzo De Quintana, "Los Océanos", undated, available on the world wide web at the following location: ucm . es / info / ecologia / Descriptiva / OCEANO2 / los_oceanos . htm (spaces added to disable hyperlink), (38 total pages, hand page numbering added).

"Mecánica de Fluidos Tf95-855", Instituto Tecnológico de Estudios Superiores de Monterrey. Undated. 32 pages.

\* cited by examiner

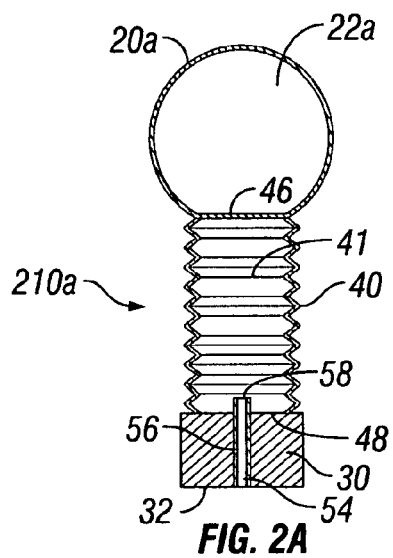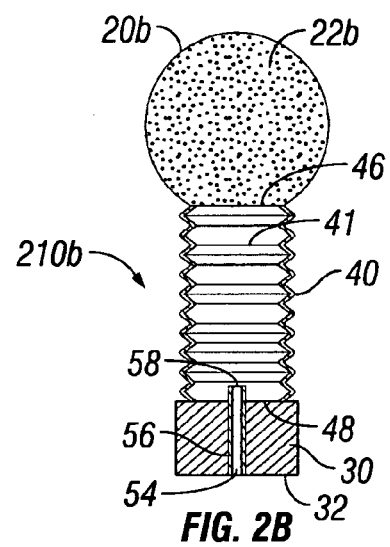
FIG. 2A
FIG. 2B
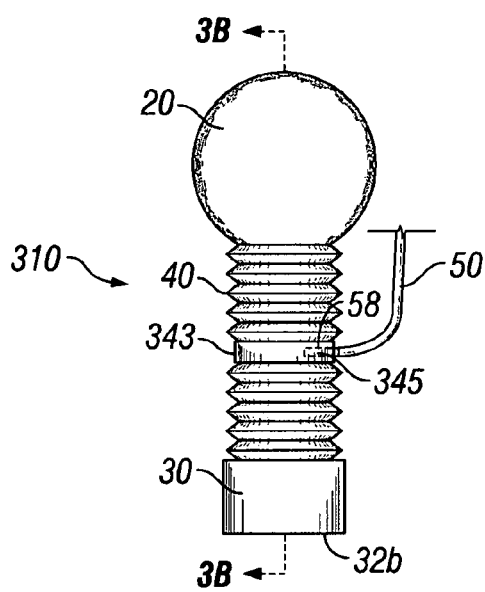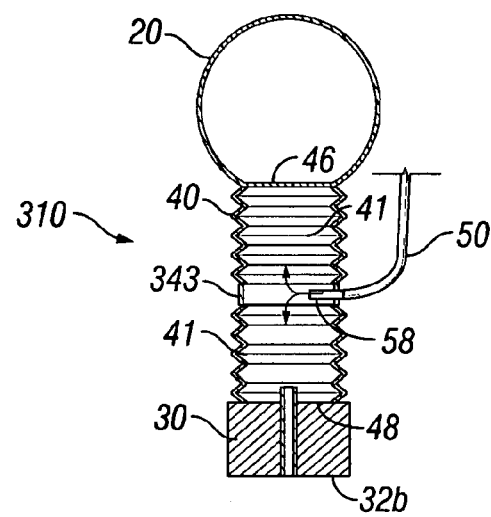
FIG. 3A
FIG. 3B

METHOD AND APPARATUS FOR USING DENSITY CHANGE TO CREATE MOVEMENT

CROSS-REFERENCE TO RELATED APPLICATIONS

This application claims the benefit of the filing date of copending U.S. Provisional Patent Application Ser. No. 60/794,467 filed Apr. 22, 2006, Confirmation No. 3809.

STATEMENT REGARDING FEDERALLY SPONSORED RESEARCH OR DEVELOPMENT

Not Applicable.

BACKGROUND OF THE INVENTION

The present invention is directed generally to the creation of movement and/or work to, e.g., generate electricity or torque to move machinery. More specifically, the present invention is directed to apparatus and methodologies that take advantage of the movement produced by a body when it changes density in relation to the ambient environment surrounding the body in order to translate such movement into the generation of electricity or torque to move machinery or other processes requiring a driving force.

BACKGROUND ART

Changes in density are employed in many areas to achieve work, such as where an air balloon's interior air is heated to lower the density of the internal air relative to the ambient air surrounding the outside of the balloon. Similarly, a submarine can change its overall weight to change its internal density relative to the surrounding water. In both of these cases, the change in density is used to create upward or downward movement of the structure (balloon, submarine), but it requires energy, such as a natural gas flame to heat the balloon's air, or a pump to change the ballast in a submarine. However, the rising and sinking of balloons and submarines is not typically thought of as being an efficient means of generating movement that can in turn be used to create a force that can be used to drive an external device. Hydroelectric dams, however, do generate electricity by using the force of gravity (the downward cascade of water) to turn, e.g., a paddle that in turn can be used to rotate a coil to generate electricity. However, hydroelectric dams do not rely on a change in density between two fluids or objects to create such force. As such, the present invention addresses the need to harness a change in density between two substances to create rotational movement, or torque, that can be harnessed for any number of useful purposes, such as, generation of electricity, movement of pistons, operation of pumps used for any liquid, such as water or petroleum, conveyors, etc. The present invention also takes advantage of the combination of opposed natural forces, such as gravity and hydrostatic pressure, to achieve such movement.

BRIEF SUMMARY OF THE INVENTION

To address the forgoing problems, the present invention teaches the use of an apparatus or frame, such as a disc, submerged or blanketed in a second fluid. Axial rotational movement in a direction of rotation is created by varying, in a controlled manner, the densities of a plurality of variable volumetric bodies disposed about a circumferential surface of the disc. In one preferred embodiment, each body has a float at its proximal end and a weight at its distal end, and an expandable diaphragm connected therebetween. The diaphragm's internal chamber is maintained in fluid communication with a first fluid having a density less than the second fluid. When placed in the second fluid the body can attain an expanded sense when the natural forces move the float and weight apart from each other, thereby allowing the diaphragm to take in the first fluid and further lessen the overall density of the body. Conversely, the body can attain a second sense when the float is below the weight thereby permitting the opposed forces of the float and weight to contract the diaphragm to expel the first fluid and increase the density of the body.

In one general embodiment, the frame moves about a substantially horizontal first axel. The circumferential surface of the frame is spaced apart from the axel by a first radial distance, or first radius. The plurality of bodies are oriented so that the distal end of one body faces the proximal end of an adjacent body. The bodies are fixed to the circumferential surface in a manner that allows full functioning of the diaphragm. Each of the bodies has a source of a first fluid made available to the interior of the diaphragm via a conduit. There are numerous mechanisms in which to provide such first fluid to the plurality of diaphragms without interfering with the rotational movement of the frame, and some of these mechanisms will be described later. The circumferential surface has a maxima point of reference at its highest vertical position relative to the axel and a minima point of reference opposite the maxima point of reference, at its lowest vertical position relative to the axel. The variable volumetric bodies are all mounted on the surface in a spaced relation at about the radial distance from the axel. The proximal ends of each of the bodies are facing the direction of desired rotation; the distal ends of each of the bodies face the opposite of the direction of rotation.

The path traveled by each body between the maxima and the minima along the path of rotation is referred to as the zone of compression, or zone of contraction. The path traveled by each body between the minima and the maxima along the path of rotation is referred to as the zone of expansion. As will be understood from the disclosure herein, as each body passes through the zone of expansion, the diaphragm draws in the first fluid through the conduit as the float is forced upward and the weight is forced downward. The resultant force is in a magnitude in the upward direction through the zone of expansion. As each body passes through the zone of contraction, the diaphragm expels out the first fluid through the conduit as the float is forced upward and the weight is forced downward. The resultant force is in a magnitude in the downward direction through the zone of contraction. As discussed throughout, the density of the second fluid is greater than the density of the first fluid. The net (resultant) force of all of the bodies present in the zone of expansion at any given moment creates an overall upward magnitude force, while the net (resultant) force of all of the bodies present in the zone of contraction at any given moment creates an overall downward magnitude force. As a result of the workings of this invention, the combination of the total downward force with the total upward force of the plurality of bodies, when coupled to a structure or frame (disc) fixed about an axel creates rotational movement, or torque, that can be harnessed for any number of useful purposes, such as, generation of electricity, movement of pistons, operation of pumps used for any liquid, such as water or petroleum, conveyors, etc.

In other preferred embodiments described herein, multiple discs (frames) can be employed, for example in the configuration of two pulleys aligned vertically above and below each other to create the desired movement and resultant force.

BRIEF DESCRIPTION OF THE SEVERAL VIEWS OF THE DRAWINGS

FIG. 2A shows an exemplary cross-sectional side view of a variable volumetric body according to a preferred embodiment of the present invention taken along lines 2A,2B-2A,2B of FIG. 1A.

FIG. 2B shows another exemplary cross-sectional side view of another variable volumetric body according to a preferred embodiment of the present invention as if taken along lines 2A,2B-2A,2B of FIG. 1A.

FIG. 3A shows a side view of another variable volumetric body according to a preferred embodiment of the present invention.

FIG. 3B shows a cross-sectional side view of another variable volumetric body according to a preferred embodiment of the present invention taken along lines 3B-3B of FIG. 3A.

DETAILED DESCRIPTION OF THE INVENTION

Figure 1A:
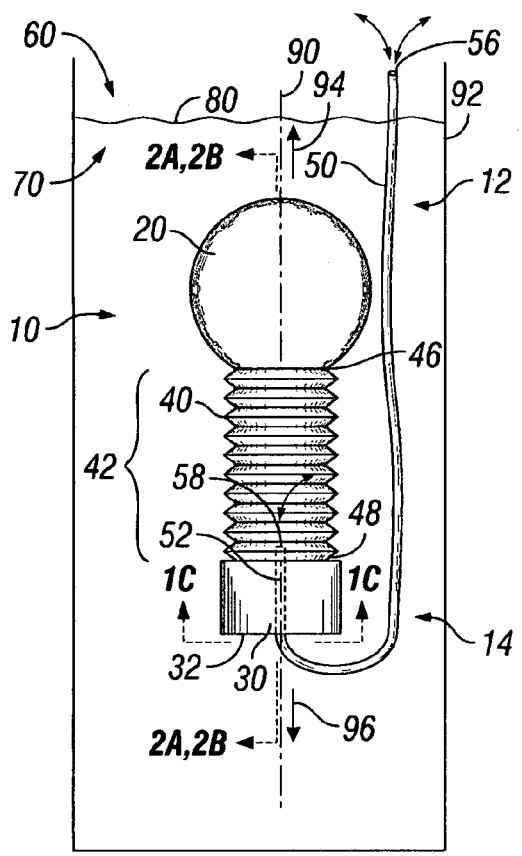
FIG. 1A shows a side view of a variable volumetric body submerged or blanketed in fluid according to a preferred embodiment of the present invention in a first sense where such body has expanded in volume and decreased in density.
Figure 1B:
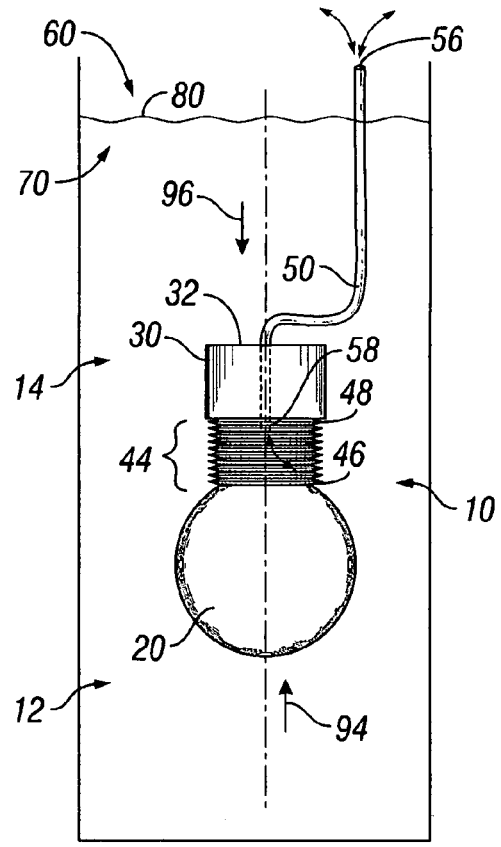
FIG. 1B shows a side view of a variable volumetric body submerged or blanketed in a fluid according to a preferred embodiment of the present invention in a second sense where such body has contracted in volume and increased in density.
Figure 1C:
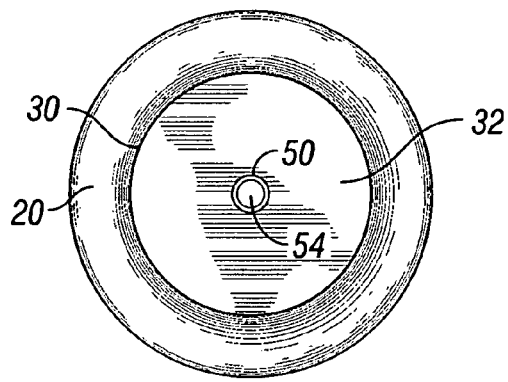
FIG. 1C shows a bottom view of a variable volumetric body taken along the line 1C-1C of FIG. 1A.

Reference is now made to the drawings which depict preferred embodiments of the present invention, but are not drawn to scale. Referring now to FIGS. 1A, 1B and 1C, there are shown three views of a preferred variable volume body 10 according to a preferred embodiment of the present invention. FIG. 1A generally shows a side view of the body 10 submerged or blanketed in a second fluid 70 in a first sense 42 where such body 10 has expanded in volume and decreased in density. FIG. 1B shows a side view of the body in a second sense 44 where such body 10 has contracted in volume and increased in density.

More specifically, still referring to FIGS. 1A, 1B and 1C, there is shown a variable volumetric body 10 comprising: a floatation device 20 located at a proximal end 12 of the body. The float 20 is configured to create a desired floatation force. The body also comprises a weight device 30 located at a distal end 14 of the body. The weight device is configured to create a desired weight force. The proximal and distal ends 12, 14 of the body are oriented on an axis 90. A diaphragm 40 is connected axially between the float 20 and the weight 30. The diaphragm 40 has an interior chamber 41 (shown in later Figures). A conduit 50, having a first end 58 in fluid communication with the diaphragm interior chamber 41 and a second end 56 in fluid communication with a first fluid 60, having a first fluid density and a first fluid pressure, is provided to permit passage of the first fluid 60 into or out of the diaphragm interior chamber 41. The diaphragm 40 is capable of, in a first sense 42, moving axially to expand in size to receive the first fluid 60 into the conduit 50 through the conduit second end 56 and into the diaphragm interior chamber 41 through conduit first end 58. The diaphragm 40 is also capable of, in a second sense 44, moving axially to contract in size to expel the first fluid 60 from the diaphragm inner chamber 41.

FIG. 1C shows a bottom view of the body 10 taken along the line 1C-1C of FIG. 1A and illustrates, for example, that the conduit 50 is in fluid communication with the diaphragm interior chamber 41 via the internal conduit space 54. The conduit 50 can pass through a fitted passage 52 in the weight 30, e.g., through the bottom 32 of the weight 30 to reach the interior of the diaphragm 41, or could be attached at a sealed interface 51 (not shown in FIG. 1A) on the weight 30, and the weight could then have an internal conduit passage 52 to place the conduit interior 54 in fluid communication with the diaphragm interior 41. The diaphragm 40 is attached to the float 20 and the weight 30 in any desired manner, for example using sealed connections 46 and 48 (in, e.g., the case where the diaphragm is constructed from a flexible, expandable accordion tube material). The diaphragm 40 could also be a self-contained, sealed unit that attaches to the weight and the float using conventional means of attachment. In one preferred embodiment, the diaphragm 40 is constructed using a flexible, expandable accordion tube-type material that permits expansion in one substantially axial direction, such as a variety of conduit like the conduit used in air conditioning ducts, and dryer exhaust vents. The diaphragm is preferably constructed of a material that is substantially impervious to the second fluid 70 and the first fluid 60. Also, it is preferred that the diaphragm be capable of withstanding any ambient pressures exerted by the second fluid 70 to prevent the diaphragm from collapsing perpendicularly toward the axis 90. For example, the diaphragm might contain one of more reinforced coiled springs that provide for axial movement, but substantially prevent movement of the diaphragm in a direction perpendicular to the direction of axial movement. Other suitable diaphragm designs could be employed to advantage to provide the desired functionality. The interface between the conduit 50 and the diaphragm interior chamber 41 remains sealed to prevent passage of the second fluid 70 into the diaphragm interior chamber 41. Numerous other ways exist to provide an interface between the conduit 50 and the diaphragm, the configuration shown in FIGS. 1A, 1B and 1C being just an example.

The float 20 could be made of any desired material, such as foam-like material (e.g., styrofoam) or other material preferably substantially impervious to the second fluid 70. The float could also be constructed in any desired size and shape, preferably one that enhances buoyancy (lightens density in the second fluid 70) and provides an aerodynamic shape to minimize friction when the float moves through the second fluid 70. The float could also be constructed to maintain a hollow interior space, such like a hollow sphere, and in such embodiment would preferably have a shell that substantially resists deformation from external pressures and is substantially impervious to the second fluid 70.

Likewise, the weight 30 can take on many different configurations known in the art. For example, the weight 30 can be constructed of a solid metal material of a desired density greater than the density of the second fluid 70, but any configuration providing a density greater than that of the density of the second fluid 70 can be used.

The body 10 is capable of operating within the second fluid 70. The second fluid 70 has a second fluid density greater than the density of the first fluid 60 and forms a boundary 80 between the two fluids 60, 70. The second fluid 70 has a second fluid pressure greater than the pressure of the first fluid 60. For example, in a preferred embodiment, the first fluid 60 comprises air and the second fluid 70 comprises water. In another example, the second fluid 70 is seawater or other saline water. However, it will be understood that any number of fluids (e.g., gases, liquids) can be selected for use with this invention where the density of the first fluid 60 is less than that of the second fluid 70. Air and water are preferred fluids based on availability and ease of handling. The second fluid 70 may be contained by natural or man-made walls or containers 92. For example, if the invention is used in a natural body of water, then there is no particular need to create any container 92, as it already exists naturally. The container 92 could also be, for example, a tank. Where air is the first fluid, there is no particular need to contain it. However, it may be preferable to provide a filter mechanism (not shown) over the end 56 of conduit 50 to prevent unwanted materials from entering into the conduit and diaphragm interior chamber 41.

The diaphragm 40 is configured to operate under the second fluid pressure so that the diaphragm will not collapse in a direction perpendicular to the axis 90. The flotation device 20 has a density less than that of the second fluid density. The weight device 30 has a density greater than the second fluid density. The diaphragm chamber 41, when receiving the first fluid 60 has an overall density less than the density of the second fluid 70. The variable volumetric body 10 has an overall density less than that of the density of the second fluid 70 when the first fluid 60 occupies the diaphragm interior chamber 41. The variable volumetric body has an overall density greater than or equal to that of the density of the second fluid when the first fluid 60 does not occupy said diaphragm interior chamber. The variable volumetric body has a first total body density when in its first sense 42, and a second overall body density, different from its first body density, when in its second sense 44.

Referring back to FIG. 1A and FIG. 1B, as will be recognized in conjunction with the disclosure herein that when the body 10 is submerged in the second fluid and placed in a substantially vertical position with the proximal (float) end 12 on top, there will be two primary forces acting on the body 10 along axis 90; namely, an upward force 94 and a downward force 96. For example, where the second liquid 70 is water, and the float 20 has a density less than water, and the weight 30 has a density greater than water, the buoyant forces 94 acting on the float 20 will urge the distal end 12 of the body 10 to move upward along the axis 90 while the gravitational forces 96 acting on the weight 30 urge the distal end 14 of the body 10 to move downward along the axis 90. These opposed movements physically open the diaphragm 40 towards its first sense 42, which also draws in the first fluid 60, e.g., air, into the conduit 50 and ultimately into the diaphragm internal chamber 41. As the chamber 41 fills with a first fluid 60 (e.g., air) that is less dense than the second fluid 70 (e.g., water), the upward force 94 grows greater. As this occurs, the overall density of the body 10 decreases relative to the density of the second fluid 70. This change in relative density creates an upward movement of the body 10 along the axis 90. The volume of the diaphragm interior chamber 41 is designed to increase sufficient to create a net positive buoyancy (or net positive upward force 94) to urge the body 10 upward.

Conversely, when the body 10 is rotated 180 degrees so that the proximal end 12 points downward along the axis 90, there exists a downward gravitational force 96 against the weight 30 that urges the weight to move downward along the axis 90 while simultaneously, an upward force 94 urges the float 20 to move upward in along the axis 90. As a result, the diaphragm 40 is compressed or contracted toward its second sense 44 which causes the first fluid 60 within the diaphragm interior chamber 41 to be expelled out the conduit 50. As this occurs, the overall density of the body 10 increases relative to density of the second fluid 70. If the overall density of the body 10 is equal to essentially the density of the second fluid, then the body 10 will become neutral buoyant. However, if the overall density of the body 10 is greater than the density of the second fluid 70, the body 10 will move downward relative to the axis 90. As will be explained in greater detail later, it will be apparent to those having the benefit of this disclosure that one or more bodies can be attached to an object and cause sufficient work to move the object. Also, as will be described in additional detail later, it will become apparent to those having the benefit of this disclosure that a plurality of bodies, each preferably of the same construction and size, can be oriented in a radially spaced, head to tail fashion about a horizontal axis to create rotational movement about such axis in the head to tail direction that can then be translated into useful work, such as to move an axel that is connected to desired drive train used to move machinery, create a pump, generate electricity, and the like.

Referring now to FIG. 2A there is shown an exemplary cross-sectional side view of a variable volumetric body 210a according to a preferred embodiment of the present invention taken along lines 2A,2B-2A,2B of FIG. 1A. In this embodiment, the float 20a is depicted as being constructed to have a hollow center core 22a in which a material(s), such as air, or a light gas, would be placed such that the float 20a has a total density less than that of the second fluid. In an alternative preferred embodiment, the core 22a could be placed in fluid communication with the diaphragm interior chamber 41. FIG. 2b shows another exemplary cross-sectional side view of another variable volumetric body 210b according to a preferred embodiment of the present invention as if taken along lines 2A,2B-2A,2B of FIG. 1A. In this preferred embodiment, as described earlier, the float 20b could be constructed of a solid or semisolid material core 22b having an overall density less than that of the second fluid 70, such as by way of example and not limitation, styrofoam.

FIG. 3A shows a side view of another variable volumetric body 310 according to a preferred embodiment of the present invention. FIG. 3B shows a cross-sectional side view of this body 310 taken along lines 3B-3B of FIG. 3A. In this embodiment, the diaphragm contains a rigid ring structure 343 for receiving the conduit 50 through conduit ring interface 345 to create the fluid communication between the interior of conduit 50 and the diaphragm interior chamber 41. Although FIGS. 1-3 illustrate only two mechanisms for interfacing the conduit 50 with the interior 41 of the diaphragm 40, numerous other means could be used to accomplish such interface, including, for example (but not shown), directing the conduit 50, in sealed fashion, through the float 20 to the interior chamber 41.

Figure 4A:
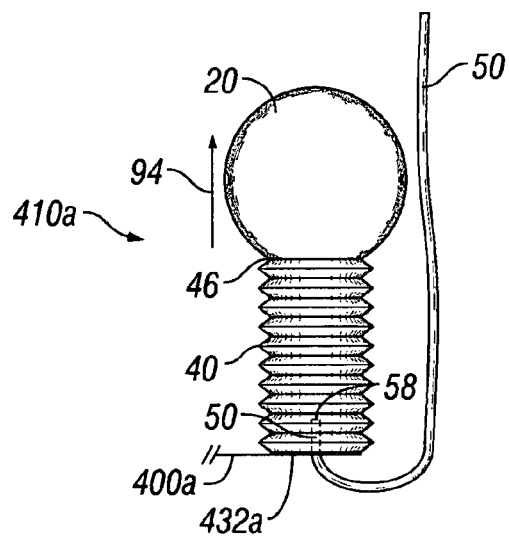
FIG. 4A shows a side view of another variable volumetric body according to another preferred embodiment of the present invention.

FIG. 4A shows a side view of another variable volumetric body 410a according to another preferred embodiment of the present invention. In this particular embodiment, there is no weight element, just the diaphragm 40 and float 20. The lower end of the diaphragm contains a sealed bottom 432a through which the conduit 50 passes in sealed fashion to interface with the interior 41 of the diaphragm 40. In this embodiment, it is necessary to fix the location of the lower end 432a of the diaphragm 40 relative to the float 20, such as by attaching attachment point 400a to another object (not shown), such as a frame described later in conjunction with, e.g., FIG. 7.

Figure 4B:
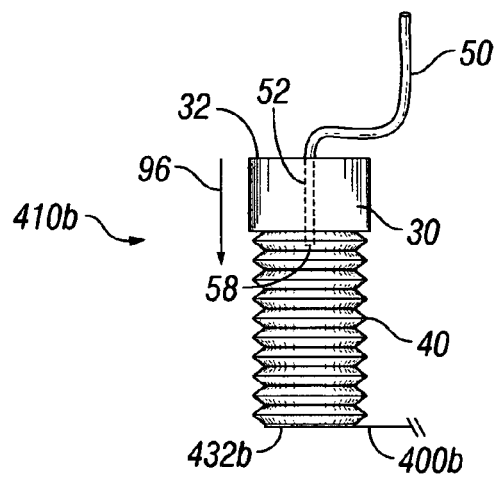
FIG. 4B shows a side view of yet another variable volumetric body according to a preferred embodiment of the present invention.

In contrast, FIG. 4B shows a side view of yet another variable volumetric body 410b containing a weight element 30 and a diaphragm 40, but no float element 20. In this embodiment, it is necessary to fix the location of the lower end 432b of the diaphragm 40 relative to the weight 30, such as by attaching attachment point 400b to another object (not shown), such as a frame described later in conjunction with, e.g., FIG. 7.

Figure 5A:
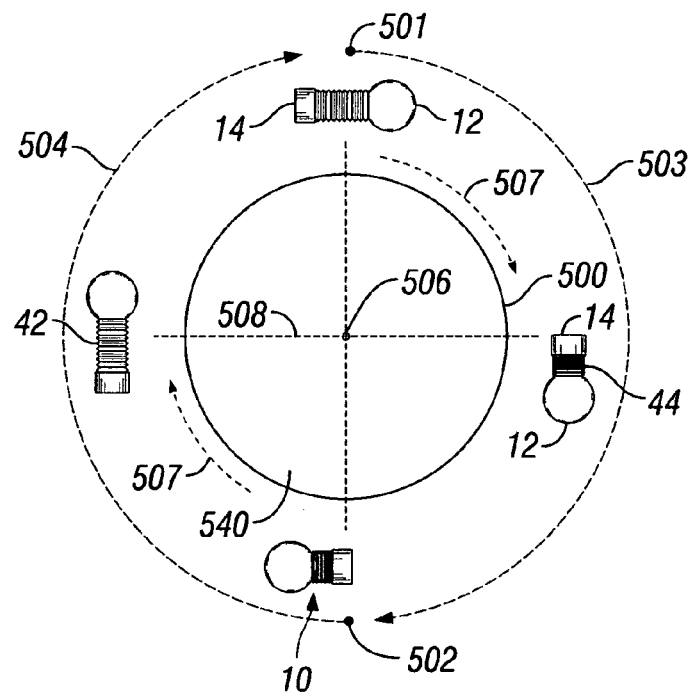
FIG. 5A is a schematic diagram of an apparatus submerged or blanketed in a fluid depicting axial rotational movement created by the differing densities of the plurality of variable volumetric bodies disposed about a circumference according to a preferred embodiment of the present invention.

FIG. 5A is a schematic diagram of an apparatus or frame 540 submerged or blanketed in a second fluid (not shown) depicting axial rotational movement in a direction of rotation 507 created by the differing densities of the plurality of variable volumetric bodies 10 (not all shown) disposed about a circumferential surface 500 according to a preferred embodiment of the present invention. In this general diagram, the frame 540 moves about a substantially horizontal first axel 506. The circumferential surface 500 is spaced apart from the axel 506 by a first radial distance, or first radius, 508. The plurality of bodies 10 are oriented so that the distal end 14 of one body 10 faces the proximal end 12 of an adjacent body 10. The bodies are fixed to the surface 500 in a manner that allows full functioning of the diaphragm 40. Each of the bodies 10, as described earlier, has a source of a first fluid 60 made available to the interior of the diaphragm 40 via conduit 50. There are numerous mechanisms in which to provide such first fluid 60 to said plurality of diaphragms 40 without interfering with the rotational movement of the frame 540, some of these mechanisms will be described later. The circumferential surface 500 has a maxima point of reference 501 at its highest vertical position relative to the axel 506 and a minima point of reference 502, opposite the maxima point of reference, at its lowest vertical position relative to the axel 506. The variable volumetric bodies are all mounted on to the surface 500 in a spaced relation at about the radial distance from the axel. As depicted in FIG. 5A, an even number of variable volumetric bodies are equally spaced about the axis. The proximal ends 12 of each of the bodies 10 facing the direction of desired rotation 507; the distal ends 14 of each of the bodies face the opposite of the direction of rotation 507.

The path traveled by each body 10 between the maxima 501 and the minima 502 along the path of rotation 507 is referred to as the zone of compression, or zone of contraction 503. The path traveled by each body 10 between the minima 502 and the maxima 501 along the path of rotation 507 is referred to as the zone of expansion 504. As is generally shown, and based on the description of the workings of the bodies 10 previously set forth, it can be seen that as each body 10 passes through the zone of expansion 504, the diaphragm 44 draws in the first fluid 60 through the conduit 50 as the float 20 is forced upward and the weight 30 is forced downward. The resultant force is in a magnitude in the upward direction through the zone of expansion 504. As each body 10 passes through the zone of contraction 503, the diaphragm 44 expels out the first fluid 60 through the conduit 50 as the float 20 is forced upward and the weight 30 is forced downward. The resultant force is in a magnitude in the downward direction through the zone of contraction 503. As mentioned throughout, the density of the second fluid 70 is greater than the density of the first fluid 60. The net (resultant) force of all of the bodies present in the zone of expansion 504 at any given moment creates an overall upward magnitude force, while the net (resultant) force of all of the bodies present in the zone of contraction 503 at any given moment creates an overall downward magnitude force. As a result of the workings of this invention, the combination of the total downward force with the total upward force of the plurality of bodies, when coupled to a structure or frame 540 fixed about an axel 506 creates rotational movement, or torque, that can be harnessed for any number of useful purposes, such as, generation of electricity, movement of pistons, operation of pumps used for any liquid, such as water or petroleum, conveyors, etc.

Figure 5B:
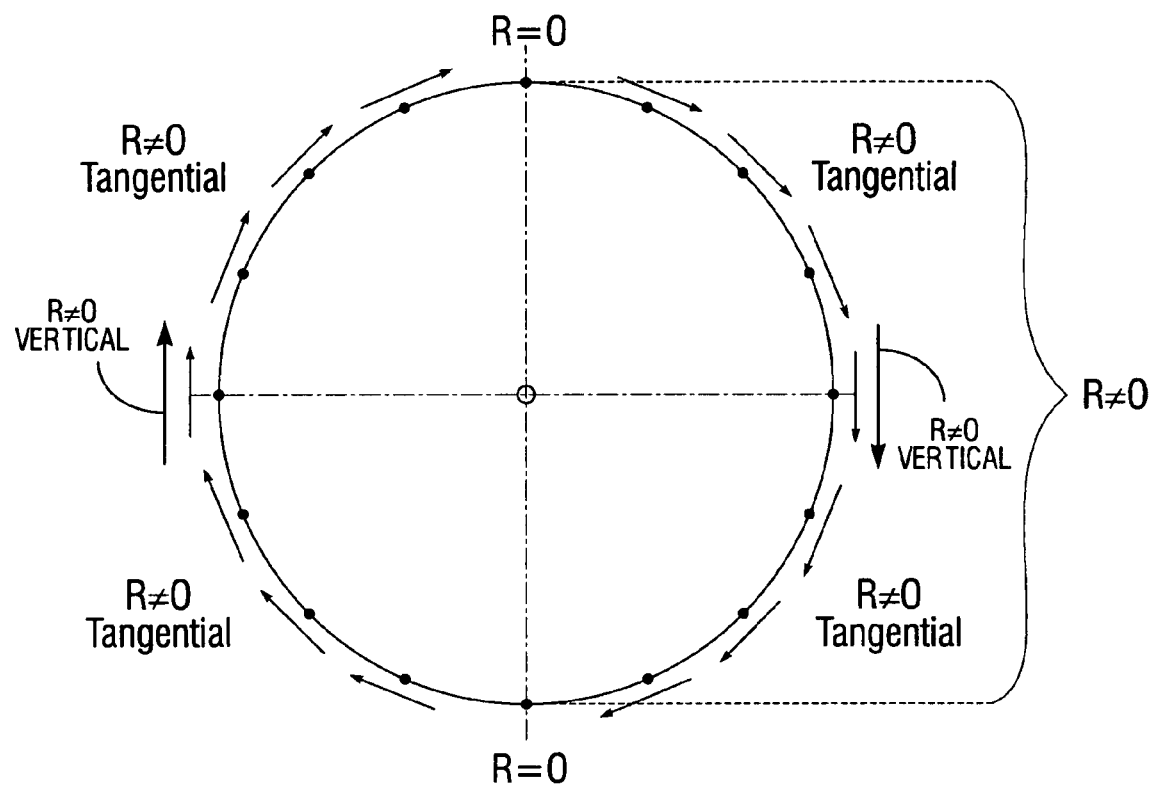
FIG. 5B is a schematic diagram illustrating the resultant forces achieved by one preferred embodiment of the present invention.

Referring in connection with FIG. 5A, FIG. 5B depicts a schematic diagram illustrating the resultant forces achieved by one preferred embodiment of the present invention. The resultant forces exerted about the axel 506 by the actions of the plurality of bodies 10 (not shown) is indicated by the tangential directional arrows shown about the circumference. As a result of these resultant forces, axial rotation is created about the axel 506.

Figure 6:
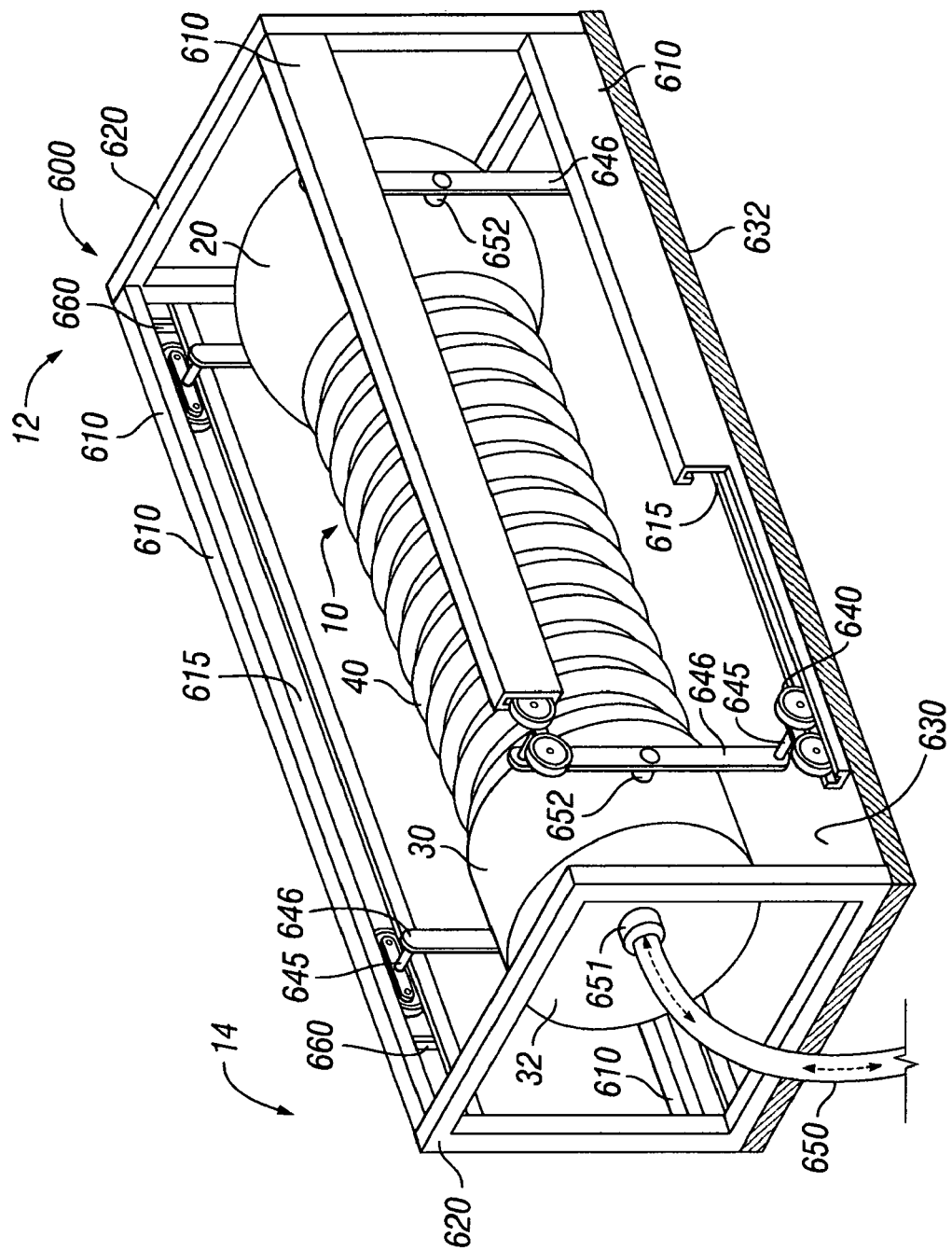
FIG. 6 is a partial cut-away perspective view of an exemplary housing containing an exemplary variable volumetric body according to a preferred embodiment of the present invention.

As mentioned earlier, each of the variable volumetric bodies 10 are placed in a fixed relationship to one another along the path of travel. There are many mechanisms for attaching the bodies 10 to, e.g., the frame in such as way that the movement and function of the diaphragm 40 remains unencumbered. One such example, of many possible options available to a skilled artisan having the benefit of this disclosure is set out in FIG. 6, which illustrates a partial cut-away perspective view of an body exemplary housing 600 containing an exemplary variable volumetric body 10 (such as those previously described) according to a preferred embodiment of the present invention. This body housing 600 is designed to contain the body 10, and permit the housing to be attached to the frame (not shown). The housing is preferably constructed of an open framework to allow the second fluid to remain in contact with the body 10. In this embodiment, the body is mounted to the housing on a moveable track system. Here, attached on both ends of the body are pairs of wheel arms 646 attached to the body at attachment points 652. At the end of each wheel arm is a set of tracking wheels 640 mounted to the arms with wheel mounts 645. The wheels 640 travel along grooves 615 in opposed sets of housing tracks 610. The housing tracks, which form part of the overall housing framework, are attached to the respective housing end pieces 620, to create, in this particular embodiment, essentially a square, or rectangular framed structure 600. The tracks 610 are fitted with stops 660 at opposite ends of each groove as desired to prevent further movement of the wheels 640.

Figure 12:
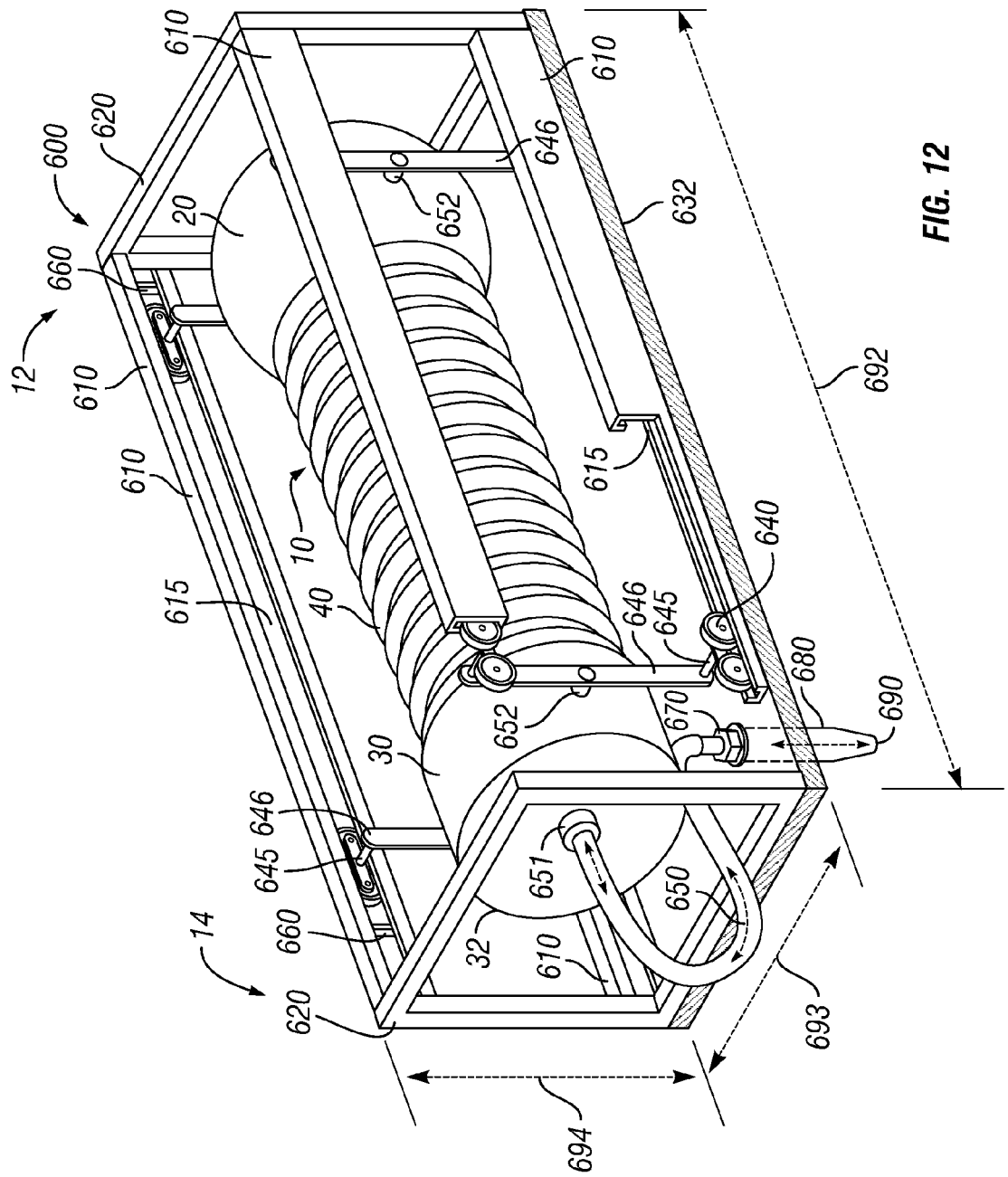
FIG. 12 is a partial cut-away perspective view of an exemplary housing containing another exemplary variable volumetric body for interfacing with the circumferential surface (and interior chamber) of a frame, such as depicted in FIGS. 9-11 according to a preferred embodiment of the present invention.

The bottom surface 632 of such housing 600 can be a solid plate, if desired, as illustrated, having an upper side 630 or can remain open. The solid plate 632 may afford the housing 600 additional strength if desired. In this particular embodiment, the overall length 692 (shown in FIG. 12) and height 694 (shown in FIG. 12) of the housing is preferably sufficient to allow the body 10 to move into its first sense 42 and attain its maximum axial movement without obstruction. Here, the conduit 650 exiting out the bottom 32 of the weight 30 is shown coupled to the bottom 32 with conduit coupling 651. The other end of the conduit can then be directed to a source of the first fluid 60 in any number of ways, some of which are described herein. As constructed, the housing 600 can then be attached to a desired surface (such as a frame as described herein) using any number of methods of attachment, including, without limitation, welding, bolting, strapping, gluing, etc. Other means exist for mounting the body to the desired surface, for example, the ring structure 343 in FIG. 3A could be attached, via arm (not shown) to the desired surface, as just one example of many possibilities.

Figure 7:
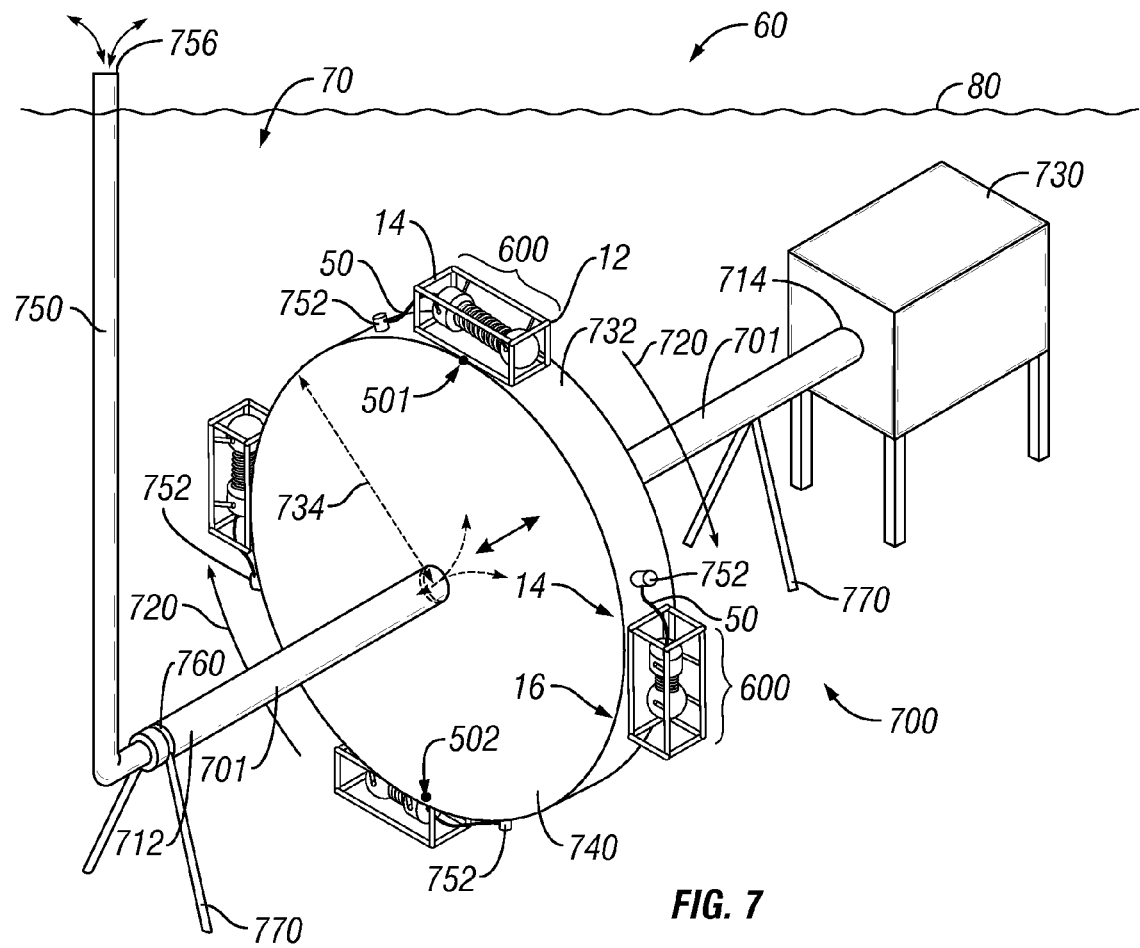
FIG. 7 is a perspective view of an apparatus submerged or blanketed in a fluid depicting rotational movement of a frame about an axis created by the differing densities of the plurality of variable volumetric bodies disposed about a circumference of the frame according to a preferred embodiment of the present invention.

Further to the conceptual overview previously provided with respect to FIG. 5A and FIG. 5B, and earlier Figures, referring now to FIG. 7, there is disclosed a perspective view of an apparatus 700 submerged or blanketed in a second fluid 70 depicting rotational movement of a frame 740 about an axel 701 in a direction of rotation 720 created by the differing densities of the plurality of variable volumetric bodies (such as those described earlier) (shown here mounted to the frame 740 via body housing 600) disposed about a circumferential surface 732 of the frame 740 according to a preferred embodiment of the present invention. In this apparatus, there is depicted an example of how useful work can be created by the invention so that, e.g., a drive train 730 can be powered to drive a desired mechanism (not shown). Here, the frame 740 resembles a disc, and is mounted for vertical rotation in the direction 720 on an axel 701. The axel, has a first axel end 712 and a second axel end 714 opposite the first end, capable of being oriented in a substantially horizontal plane within the second fluid 70. The axel 701 is capable of 360 degrees of rotation to create a path of rotation 720 in a first direction. The axel 701 is also capable of being attached to a desired drive train 730 for transmitting the rotation of the axel to another device. As generally depicted here, the axel 701 is supported at the first axel end and/or second axel end with support structure 770 sufficient to provide the necessary clearance to permit unencumbered rotation of the plate 740. The overall structure of apparatus 700 is preferably secured to a surface at the base of the apparatus 700 to prevent, e.g., the apparatus from falling over. Such methods for securing are well understood in the art.

In this embodiment, the frame 740 is fixedly and substantially perpendicularly connected around the axel 701 and oriented to create a circumferential surface 732 at a desired radial distance 734 from the axel 701 for receiving the plurality of variable volumetric bodies 600. The circumferential surface has a maxima point of reference 501 at its highest vertical position relative to the axel 701 and a minima point of reference 502 opposite the maxima point of reference at its lowest vertical position relative to the axel. The variable volumetric bodies 600 are mounted to and oriented about the circumferencial surface 732 so that the distal end 14 of one of the variable volumetric bodies faces the proximal end 12 of an adjacent one of the variable volumetric bodies all in a spaced relation at about the radial distance 734 from the axel 701. As depicted in FIG. 7, an even number of variable volumetric bodies 600 are equally spaced about the surface 732. The proximal ends 12 of each of the variable volumetric bodies 600 are facing the first direction of rotation 720, the distal ends 14 of each of the variable volumetric bodies 600 are facing the opposite of the direction of rotation 720.

Figure 7A:
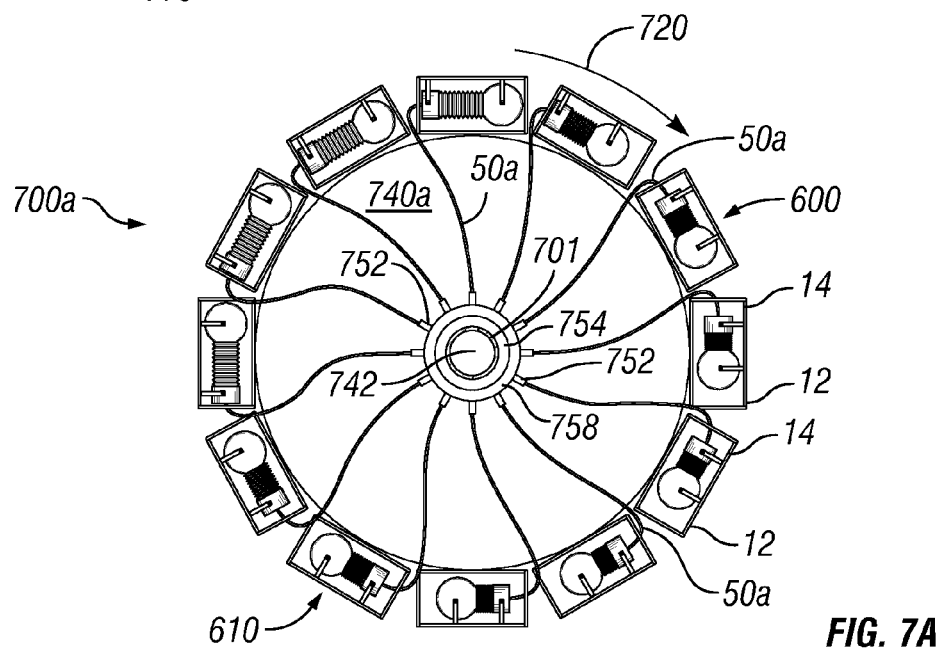
FIG. 7A is a side view of an exemplary frame apparatus depicting the disposition of a plurality of variable volumetric bodies about its circumference according to a preferred embodiment of the present invention.
Figure 7B:
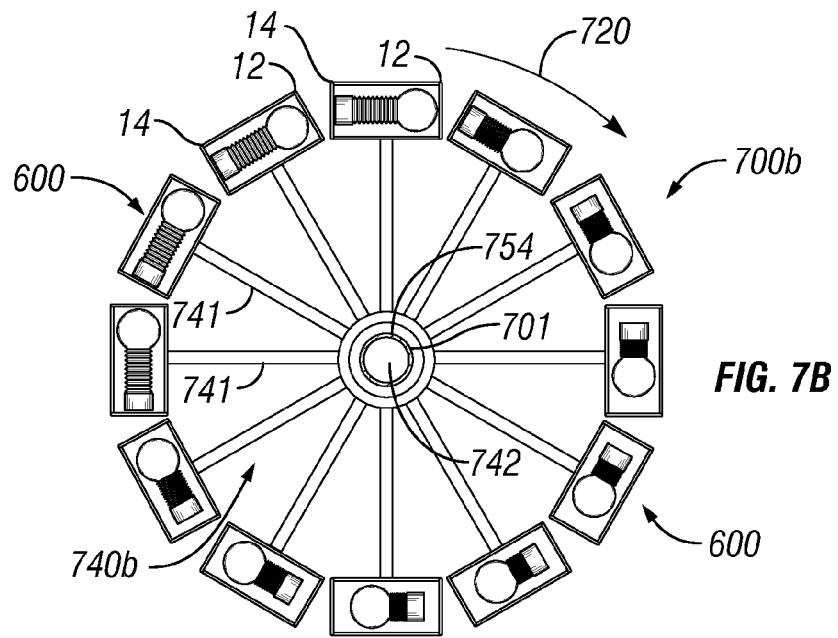
FIG. 7B is a side view of another exemplary frame apparatus depicting the disposition of a plurality of variable volumetric bodies about its circumference according to another preferred embodiment of the present invention.

As mentioned earlier, providing the conduits 50 on each body 10 with access to the first fluid 60 can be achieved in many different ways that would be known to those of ordinary skill in the art. In this embodiment, the frame 740, itself, serves as a manifold for fluid communication with the first fluid 60, through conduit opening 756, conduit 750 and the interior of axel 701. In this particular embodiment, the axel is outfitted with a rotatable, sealed junction 760 proximate the end 712 of axel 701 to permit the rotating axel to join the stationary conduit 750. Or, (not shown) the axel could remain stationary, and the frame 740 would rotate about sealed bearings attached about the axel. The interior of the frame 740 would be hollow and would permit the first fluid 60 to obtain fluid communication with the body conduit 50 via conduit couplings 752. Referring also to FIGS. 7A and 7B, alternate methods for permitting such fluid communication are set forth.

FIG. 7A is a side view of an exemplary frame apparatus 740a depicting the disposition of a plurality of variable volumetric bodies 600 about its circumference according to a preferred embodiment of the present invention. As depicted in FIG. 7A, an even number of variable volumetric bodies are equally spaced about the circumference. In this embodiment, the conduit 50 lead down the exterior face of the frame 740a and plug into a manifold hub 758 that has sufficient number of ports 752 to place each conduit 50 into fluid communication with the interior of such hub, such hub itself being in fluid communication with the axel interior space 742, which in turn as described above, is in fluid communication with first fluid 60 via conduit 750.

Additionally, FIG. 7B depicts a side view of another exemplary frame apparatus 740b illustrating the disposition of a plurality of variable volumetric bodies 600 about its circumference according to another preferred embodiment of the present invention. As depicted in FIG. 7B, an even number of variable volumetric bodies are equally spaced about the circumference. In this embodiment, rather than having the appearance of a hollow disc, as in FIG. 7, the frame 740b appears like a spoked wheel, each spoke 741 in fluid communication with the interior space 742 of axel so that fluid communication can be established between the first fluid 60 and each diaphragm through conduit (not shown).

Much like was discussed with respect to FIG. 5, the frame 740 has a zone of contraction 503 (not indicated) located between the maxima point 501 and the minima point 502 along the path of rotation in the first direction 720. The frame 740 has a zone of expansion 504 (not indicated) located between the minima point 502 and the maxima point 501 along the path of rotation in the first direction 720.

As previously described, the variable volumetric bodies 600 are capable of moving into their respective first sense 42 when the variable volumetric bodies pass through the zone of expansion. Also, the variable volumetric bodies 600 are capable of moving into their second sense when they pass through the zone of contraction. As each body 10 (within its housing 600 attached to the frame 740) passes through the zone of expansion 504 (not illustrated), the diaphragm 40 draws in the first fluid 60 through the conduit 50 as the float 20 is forced upward and the weight 30 is forced downward. The resultant force is in a magnitude in the upward direction through the zone of expansion 504. As each body 10 passes through the zone of contraction 503, the diaphragm 40 expels out the first fluid 60 through the conduit 50 as the float 20 is forced upward and the weight 30 is forced downward. The resultant force is in a magnitude in the downward direction through the zone of contraction 503. As mentioned throughout, the density of the second fluid 70 is greater than the density of the first fluid 60. The net (resultant) force of all of the bodies present in the zone of expansion 504 at any given moment creates an overall upward magnitude force, while the net (resultant) force of all of the bodies present in the zone of contraction 503 at any given moment creates an overall downward magnitude force. As a result of the workings of this invention, the combination of the total downward force with the total upward force of the plurality of bodies, when coupled to a structure or frame 740 fixed about an axel 701 creates rotational movement 720, or torque, that can be harnessed and transferred to, e.g., a drive train 730 for any number of useful purposes, such as, generation of electricity, movement of pistons, operation of pumps used for any liquid, such as water or petroleum, conveyors, etc.

The apparatus 700 can be used by introducing or otherwise placing the apparatus into the second fluid 70, preferably submersing the structure so that all of the bodies 600 remain beneath the surface of the second fluid 70. The second end of the conduit 756 is maintained in fluid communication with the first fluid 60. As desired, the axel can be coupled with a desired drive train to create useful work. The rotation of the frame about the axel can commence by permitting the contraction of the diaphragms of those of the plurality of variable volumetric bodies that are in the zone of contraction while substantially simultaneously permitting the expansion of the diaphragms of those of the plurality of variable volumetric bodies that are in the zone of expansion. As may be desired, the speed of rotation can be regulated with a governor or other suitable means, such as a brake (not shown), or by regulating the passage of the first fluid 60 into and out of the conduit 750 via a valve or other mechanism. Additionally, a clutch-type mechanism could be used to disengage and reengage the rotation of the frame relative to, e.g., the drive train.

Figure 8A:
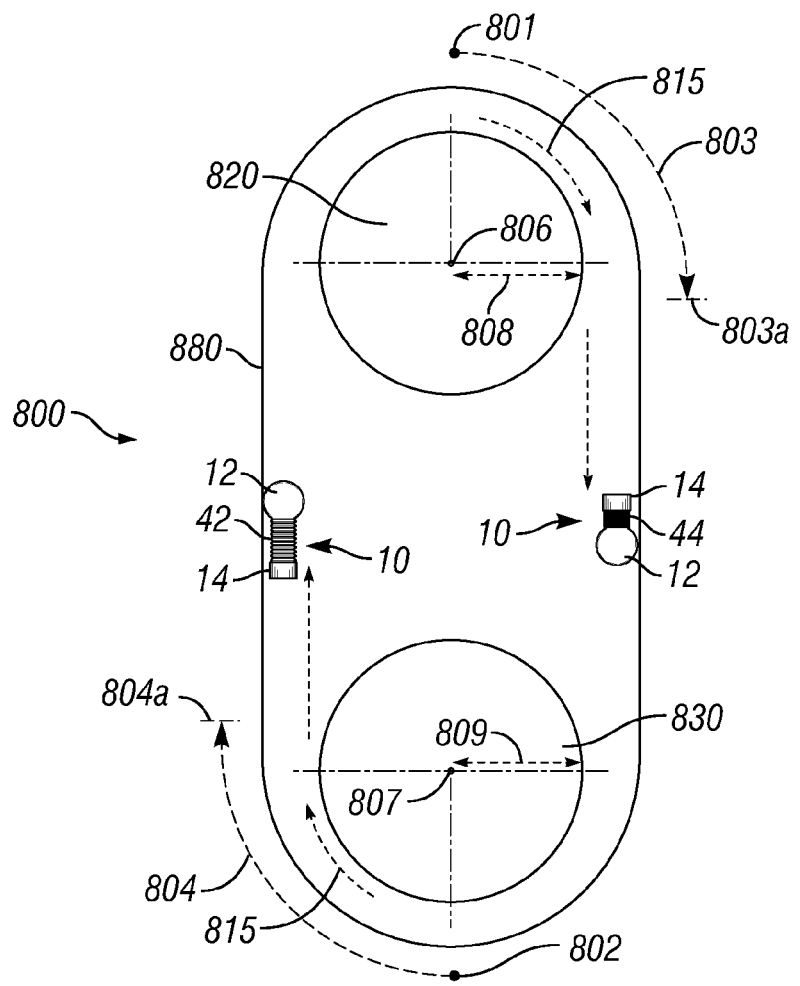
FIG. 8A is a schematic diagram of an apparatus, submerged or blanketed in a fluid, depicting rotational movement of a belt about two axels created by the differing densities of the plurality of variable volumetric bodies disposed about the belt according to a preferred embodiment of the present invention.

Similar to FIG. 5A, FIG. 8A reflects a schematic diagram of an apparatus 800, submerged or blanketed in a second fluid 70, depicting rotational movement in a first direction 815 of a belt 880 linking two frames 820, 830 that rotate about their respective axels 806, 807, such rotational movement being created by the differing densities of the plurality of variable volumetric bodies 10 (not all shown) disposed about the belt 880 according to a preferred embodiment of the present invention. As depicted in FIG. 8A, an even number of variable volumetric bodies are equally spaced about the belt. The basics of operation of this embodiment are similar to that of the previous embodiments, except that rather than having a completely circular path of rotation (e.g., 720 in FIG. 7) this schematic presents an oval path of travel 815. As such, the additional vertical length of the travel of the belt 880 between each frame on either side increases the amount of variable volumetric bodies 10 that can be present operating in their respective first and second senses 42, 44 on opposed sides of the belt to increase the resultant summary of downward forces on the downward directional side of the belt (here the right side) and to increase in the resultant summary of upward forces on the upward directional side of the belt (here the left side) thereby increasing the overall rotational force available from axels 806, 807.

In the embodiment generally illustrated in FIG. 8A, there is a first frame 820 disposed in a substantially vertical plane capable of rotation about first axel 806 (the first axel being generally disposed in a horizontal plane). The first frame 820 has a first radius 808 about such first axel 806. Located below the first frame 820 is second frame 830 disposed in a substantially vertical plane capable of rotation about second axel 807 (the second axel being generally disposed in a horizontal plane). The second frame 830 has a second radius 809 about such second axel 807.

Similarly with FIG. 5, this dual axel embodiment 800 illustrated in FIG. 8A has a maxima point of reference 801 located at the maximum vertical point above the first axel 806 along the direction of travel 815 and a minima point of reference 802 located at the lowest vertical point below the second axel 807 along the path of travel 815. A zone of contraction 803 exists between the maxima 801 and zone of contraction end point 803a along the path of travel 815. A zone of expansion 804 exists between the minima 802 and the zone of expansion end point 804a along the path of travel 815. A belt 880, or other connection device, links the rotation of the first frame 820 with the second frame 830. As is generally shown, and based on the description of the workings of the bodies 10 previously set forth, it can be seen that as each body 10 passes through the zone of expansion 804, the diaphragm 44 draws in the first fluid 60 through the conduit 50 as the float 20 is forced upward and the weight 30 is forced downward. The resultant force is in a magnitude in the upward direction through the zone of expansion 804. As depicted in FIG. 8A, an even number of variable volumetric bodies are equally spaced apart from each other. As each body 10 passes through the zone of contraction 803, the diaphragm 44 expels out the first fluid 60 through the conduit 50 as the float 20 is forced upward and the weight 30 is forced downward. The resultant force is in a magnitude in the downward direction through the zone of contraction 803. As mentioned throughout, the density of the second fluid 70 is greater than the density of the first fluid 60. The net (resultant) force of all of the bodies present in the zone of expansion 804 and between the minima 802 and maxima 801 along the path of travel 815 at any given moment creates an overall upward magnitude force (some tangential, some vertical), while the net (resultant) force of all of the bodies present in the zone of contraction 803 and between maxima 801 and minima 802 along the path of travel 815 at any given moment creates an overall downward magnitude force (some tangential, some vertical). As a result of the workings of this invention, the combination of the total downward force with the total upward force of the plurality of bodies, when coupled to the structures or frames 820, 830 fixed about their respective axels 806, 807 creates rotational movement, or torque, that can be harnessed for any number of useful purposes as described herein, such as, generation of electricity, movement of pistons, operation of pumps used for any liquid, such as water or petroleum, conveyors, etc.

Figure 8B:
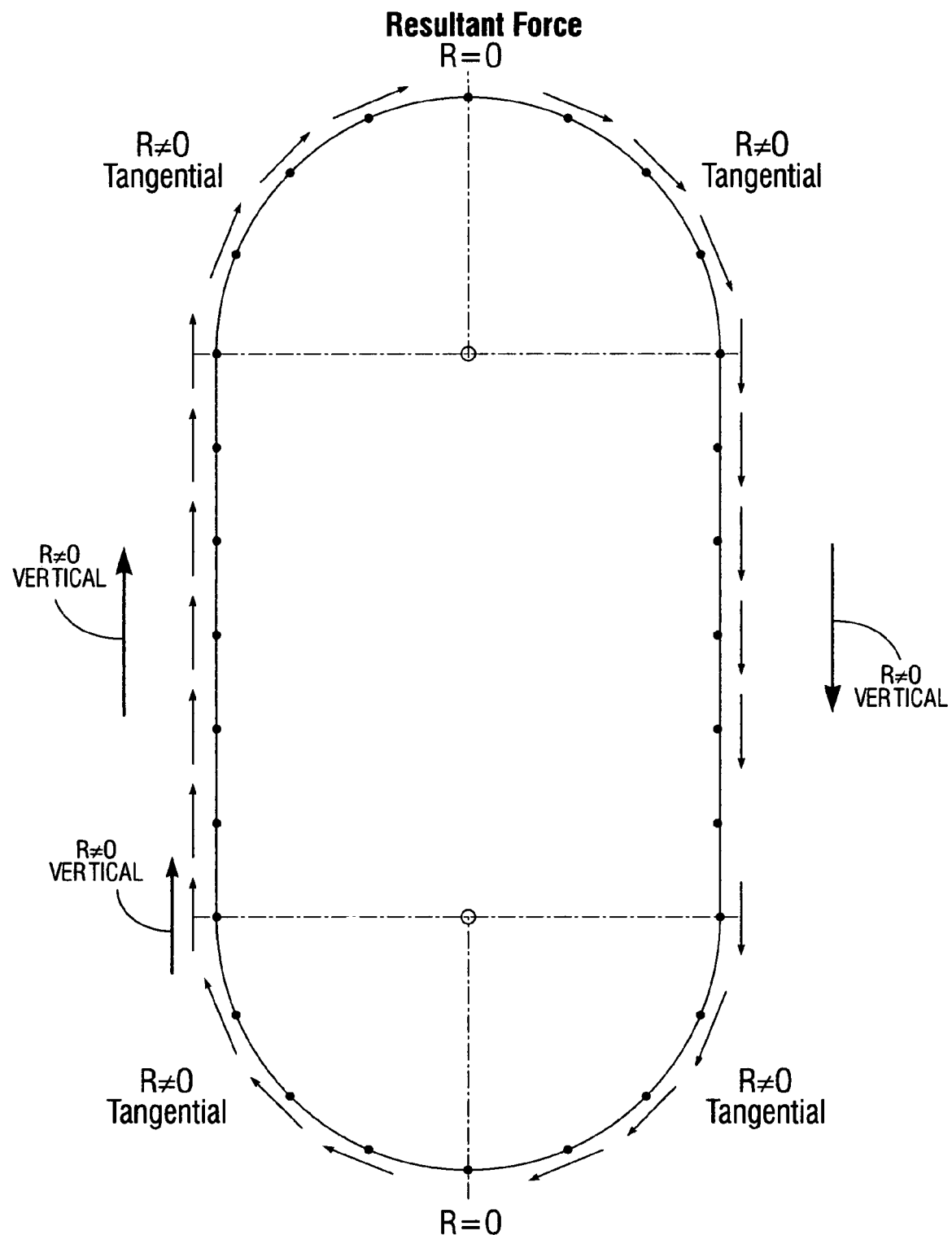
FIG. 8B is a schematic diagram illustrating the resultant forces achieved by another preferred embodiment of the present invention.

Referring in connection with FIG. 8A, FIG. 8B depicts a schematic diagram illustrating the resultant forces achieved by dual axel embodiment of the present invention. The resultant forces exerted about the axels 806 and 807 by the actions of the plurality of bodies 10 (not shown) is indicated by the tangential directional arrows shown about the circumference of both frames, and the parallel directional arrows shown along the vertical portions of the belt. As a result of these resultant forces, axial rotation is created about both axels 806 and 807.

Figure 9:
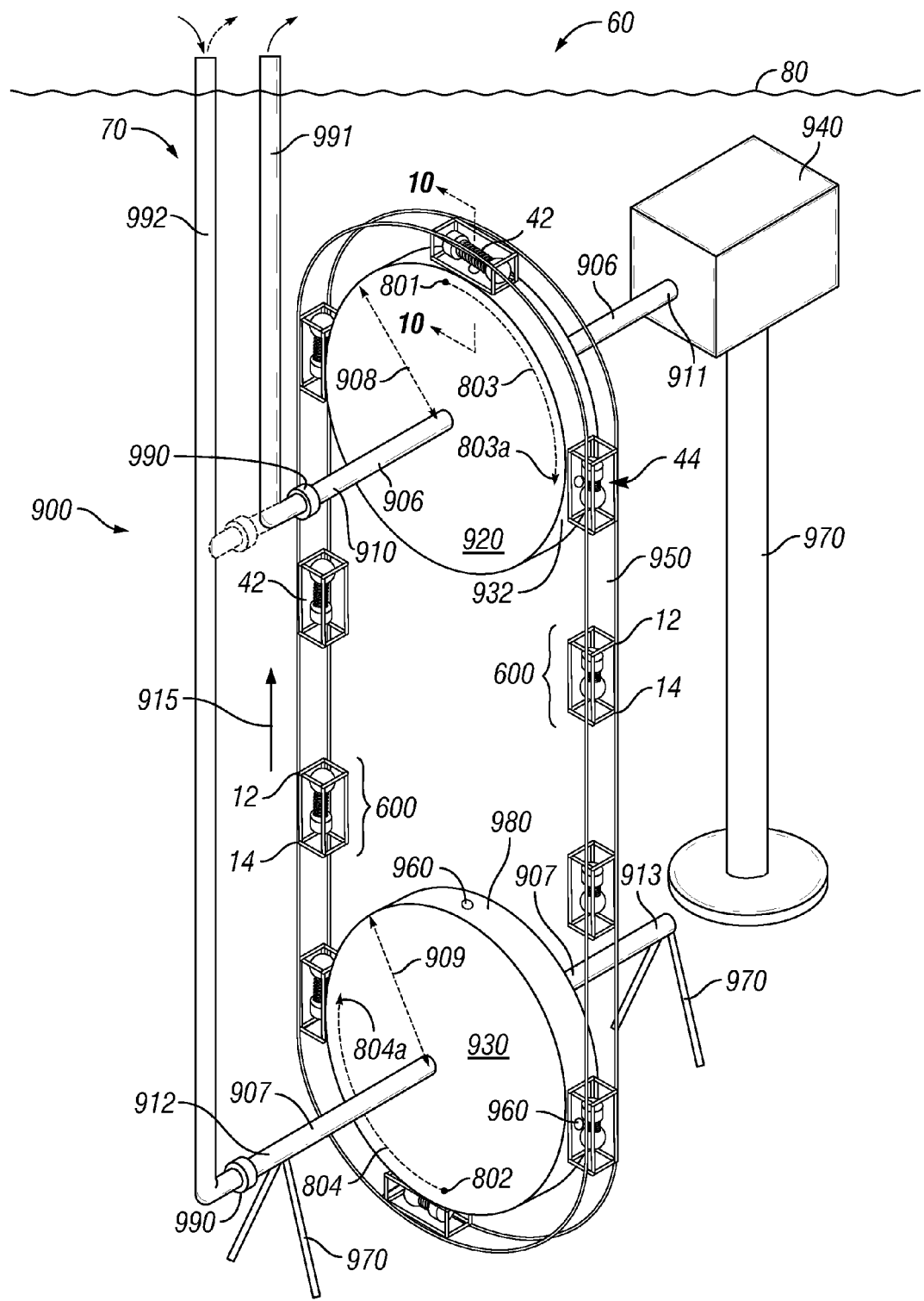
FIG. 9 is a perspective view of an apparatus having two rotating frames, submerged or blanketed in a fluid, depicting rotational movement of a belt, about two axels containing the respective frames, created by the differing densities of the plurality of variable volumetric bodies disposed about the belt according to a preferred embodiment of the present invention.

Referring now to FIG. 9 (also in conjunction with the teachings from prior Figures, including FIGS. 8A and 8B), there is shown a perspective view of an apparatus 900 having two rotating frames, 920, 930 submerged or blanketed in a second fluid 70, depicting rotational movement in a direction of travel 915 of a belt 950, about two axels, 906, 907 containing their respective frames, 920, 930 created by the differing densities of the plurality of variable volumetric bodies 10 as described herein shown in housings 600 disposed about the belt 950 according to a preferred embodiment of the present invention. As depicted in FIG. 9, an even number of variable volumetric bodies are equally spaced about the belt 950. In this apparatus 900, there is depicted an example of how useful work can be created by the invention so that, e.g., a drive train 940 can be powered to drive a desired mechanism (not shown).

The exemplary embodiment of FIG. 9 has a first axel 906, having a first axel end 910 and a second axel end 911 opposite said first end, capable of being oriented substantially horizontally within said second fluid 70, said first axel 906 capable of 360 degrees of rotation to create a path of rotational movement in a first direction 915. There is also provided a second axel 907, having a first axel end 912 and a second axel end 913 opposite said first end, also capable of 360 degrees of rotational movement in said first direction of travel 915, said second axel 907 being aligned substantially vertically below and substantially parallel with the first axel 906. As illustrated, the first axel 906 (and/or the second axel 907) are also capable of being attached to a desired drive train 940 (show here being attached to the first axel 906) for transmitting the rotation of the first axel 906 and/or the second axel 907 to another device (not shown). As will be understood, as generally shown, the first axel 906 and second axel 907 are provided suitable support structure, e.g., 970, at their respective first axel ends 910, 912 and/or their second axel ends 911, 913. As also shown, necessary clearance is available to permit unencumbered rotation of the discs 920, 930. The overall structure of apparatus 900 is preferably secured to a surface at the base of the apparatus 900 to prevent, e.g., the apparatus from falling over. Such methods for securing are well understood in the art. All or part of the apparatus 900 could be housed in a trench, or other structure beneath the surface of second fluid 70 so long as the bodies 10 are permitted to contact the second fluid 70.

Still referring to FIG. 9, there is shown a first frame 920 fixedly and substantially perpendicularly connected around the first axel 906 and oriented to create a first circumferential surface 932 at a desired first radial distance 908 from the first axel 906. There is also shown a second frame 930 fixedly and substantially perpendicularly connected around the second axel 907 and oriented to create a second circumferential surface 980 at a desired second radial distance 909 from the second axel 907. The first axel 906 is spaced apart from the second axel 907 by at least the combined length of first radial distance 908 and the second radial distance 909 so that the movement of the first frame 920 about first axel 906 will not interfere with the movement of the second frame 930 about second axel 907. Here, similar with the embodiment described in FIG. 7 the frames 920, 930 resemble discs.

There is also depicted a belt 950, for receiving the plurality of variable volumetric bodies 10 in their respective housings 600, connecting the first frame 920 to the second frame 930. The belt 950 is located around portions of the first and second circumferential surfaces 932, 980 to synchronize the rotational movement of the first frame 920 about first axel 906 with the rotational movement of the second frame 930 about second axel 907 in the direction of travel 915. As previously described in connection with FIG. 8A, the first circumferential surface 932 has a maxima point of reference 801 at its highest vertical position relative to the first axel 906; the second circumferential surface 980 has a minima point of reference 802 at its lowest vertical position relative to second axel 907 along the path of travel 915.

The variable volumetric bodies 10 (shown here in housings 600) are mounted to and oriented about the belt 950 so that the distal end 14 of one of the variable volumetric bodies 10 faces the proximal end 12 of an adjacent one of the variable volumetric bodies 10 all in a spaced relation along the belt 950. The proximal ends 12 of each of the variable volumetric bodies 10 face the first direction of travel 915, the distal ends of each of the variable volumetric bodies 10 face the opposite of the first direction of travel 915.

A zone of contraction 803 exists between the maxima 801 and zone of contraction end point 803a along the path of travel 915. A zone of expansion 804 exists between the minima 802 and the zone of contraction end point 804a along the path of travel 915. The variable volumetric bodies 10 are capable of moving into their first sense 42 when the variable volumetric bodies pass through the zone of expansion 804, the expansion being attributable to a substantially upward movement of the flotation device 20 and a substantially vertical downward movement of the weight device 30. The variable volumetric bodies 10 are also capable of moving into their second sense 44 when the variable volumetric bodies 10 pass through the zone of contraction 803, the contraction being attributable to a substantially vertical upward movement of the flotation device 20 and a substantially vertical downward movement of the weight device 30.

As mentioned earlier, providing the conduits 50 on each body 10 with access to the first fluid 60 can be achieved in many different ways that would be known to those of ordinary skill in the art. In the embodiment of FIG. 9, for example, and similar to the discussion of FIG. 7, the frames 920, 930, themselves, serve as manifolds for fluid communication with the first fluid 60, through conduits 992, 991 and the interior of axels 906, 907. In this particular embodiment, the conduits 991 and 992 can be separate (as shown) or connected (as illustrated with the broken lines). Much like with the FIG. 7 embodiment, the axels 906, 907 can be outfitted with rotatable, sealed junctions 990 proximate the ends 912, 910 of axels 906, 907 to permit the rotating axels to join the stationary conduits 992, 991. Or, (not shown) the axels could remain stationary, and the frames 920, 930 would rotate about sealed bearings attached about their axels. The interior of the frames 920, 930 would be hollow and would permit the first fluid 60 to obtain fluid communication with the body conduit 50 via conduit couplings 960. However, unlike in the example of FIG. 7, the bodies 10 traveling about the belt are not always in direct contact with the frames 920, 930. As such, in one preferred embodiment, as each body 10 moves through either the zone of contraction 803 or the zone of expansion 804, the body conduit 50 is provided with a temporary mated connection to the respective frames, 920, 930 to permit fluid communication with first fluid 60. Once each body leaves either zone 803, 804, and decouples with the mated connection, the diaphragm will remained sealed and will not have access to first fluid 60, and will remain sealed against intrusion of second fluid 70.

Figure 10:
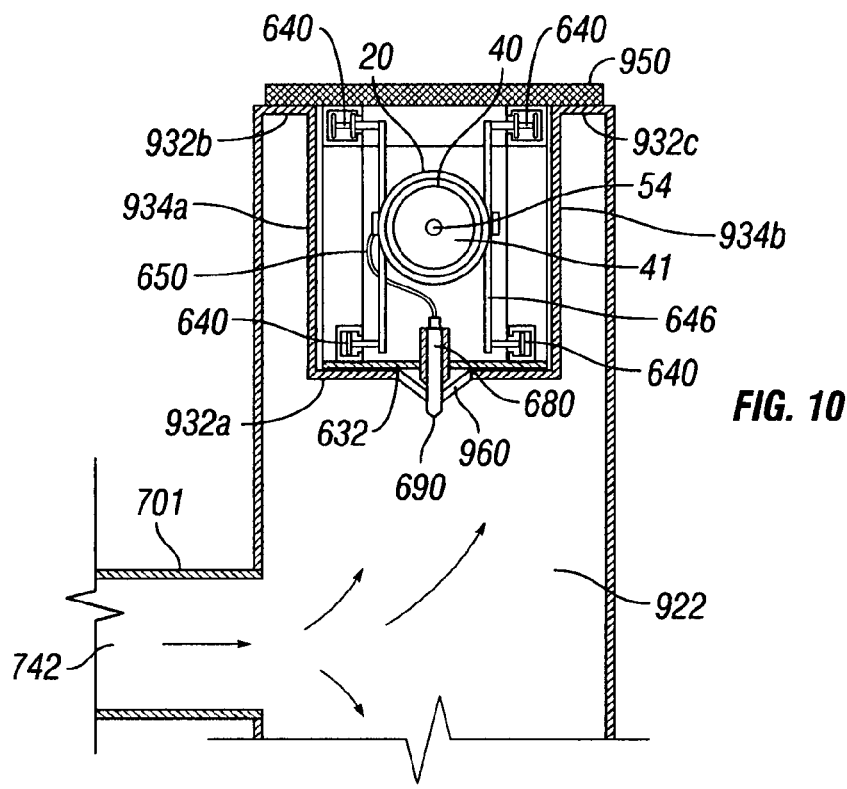
FIG. 10 is a cross-sectional view taken along line 10-10 of FIG. 9 illustrating an exemplary interface between an exemplary housing containing an exemplary variable volumetric body and the circumferential surface (and interior chamber) of a frame according to a preferred embodiment of the present invention.

This connectable and disconnectable mated connection between body conduit 50 and the inner chamber (922) of frames 920, 930 could be achieved in many ways known in the art. For example, referring now to FIG. 10 (in connection with FIG. 12 and FIG. 6), there is shown an example of what a cross-sectional view taken along line 10-10 of FIG. 9 might depict (although this is not intended to be an exact cross-sectional view) illustrating an exemplary mated interface (680, 690, 960) between an exemplary housing 600 containing an exemplary variable volumetric body 10 and the circumferential surface 932 (and interior chamber 922) of a frame, e.g., 920 according to a preferred embodiment of the present invention. In FIG. 10, there is shown that the frame (disc) 920 can have, in one embodiment, within its outer circumferential surface 932 a groove defined by groove side walls 934a, 934b, groove top walls 932b, 932c and groove bottom wall 932a.

As can be seen here, each housing 600 is attached to the belt 950. The length of each groove side wall 934a, 934b is preferably about equal to the height 694 (shown in FIG. 12) of the housing 600 and the width of groove bottom wall 932a is preferably about equal to the width 693 (shown in FIG. 12) of housing 600 to permit the bottom surface 632 of housing 600 to be guided into position proximate the groove bottom wall 932a. As illustrated, the body 10 is outfitted with a conduit connection 670 through surface 632 to connect the conduit 650 with a mating valve 680 (having tip 690) capable of mating with a receiving valve 960 located in the groove bottom wall 932a such that when the body housing is transported by the belt 950 into the frame's groove, the mating of valve 690 with valve 960 will permit fluid communication to be established between the frame internal chamber 922 and the interior of the body conduit 650. Preferably, the shape of the valve 960 is such that it serves to guide tip 690 into mating relationship with valve 960. For example, the valve could maintain a frustoconical surface to guide the tip 690 of valve 680 into a mating relation with valve 960. When the belt transports this housing further in the direction of travel, the mated valves 690, 960 decouple and remain sealed until such valves engage again in a mated coupling. As can be seen in connection with FIG. 9, this mated coupling of the valves 960, 680 takes place during the zone of contraction 803 or zone of expansion 804.

Figure 11:
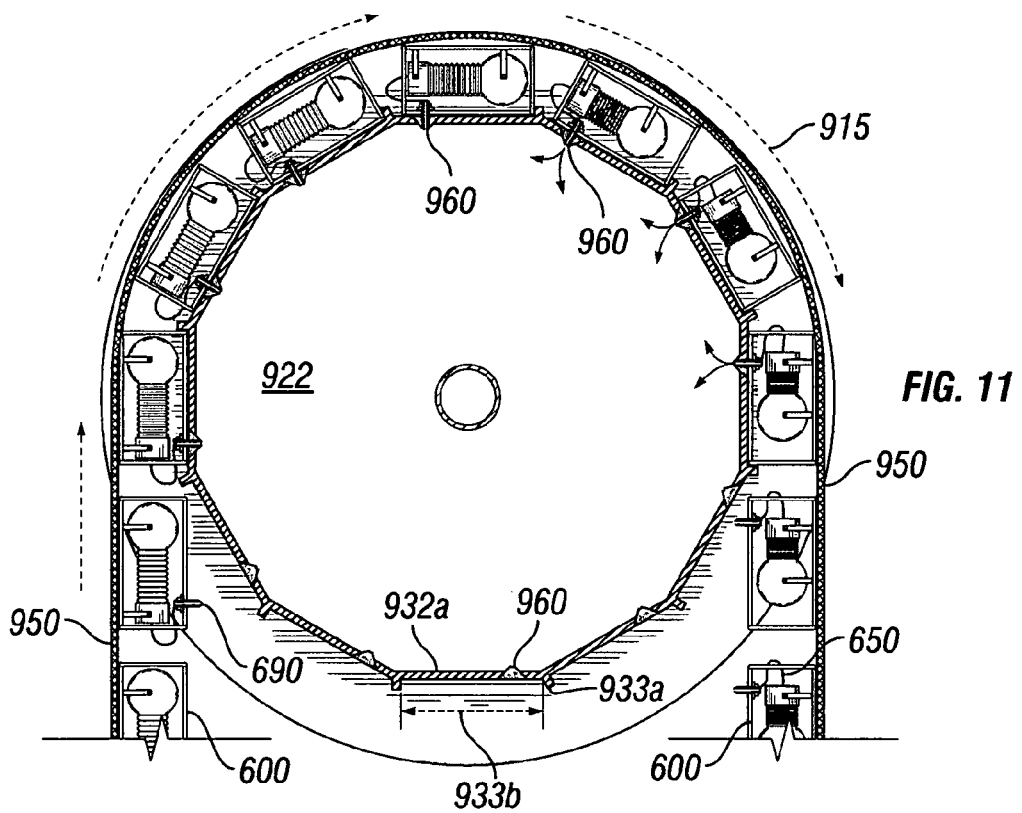
FIG. 11 is a partial cut-away of a frame, such as that shown in FIGS. 9-10 containing exemplary interfaces between exemplary housings containing exemplary variable volumetric bodies and the circumferential surface (and interior chamber) of a frame according to a preferred embodiment of the present invention.

FIG. 11 depict a partial cut-away of a frame, such as that shown in FIGS. 9-10 containing exemplary interfaces between exemplary housings containing exemplary variable volumetric bodies and the circumferential surface (and interior chamber) of a frame according to a preferred embodiment of the present invention. For example, in this embodiment, the belt 950 and housings 600 serve much like a chain in function while spaced stops 933a serve as sprockets. Here, each sprocket (stop) 933a is separated by a distance 933b that is preferably about equal to the length 692 of housing 600. Again, much like with FIG. 10, the valve tip 690 is situated in housing 600 to be aligned with valve 960 when housing surface 632 engages surface 932a of the frame.

While the apparatus and methods of this invention have been described in terms of preferred embodiments, it will be apparent to those of skill in the art that variations may be applied to the process and system described herein without departing from the concept and scope of the invention. All such similar substitutes and modifications apparent to those skilled in the art are deemed to be within the scope and concept of the invention. Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art. While the apparatus and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims. For example, although in the operation of the apparatus 900 of FIG. 9 it is preferred that the frames 920, 930 be maintained below the surface of second fluid 70, it is also envisioned that the dual frame embodiment 900 could operate where only the lower (second) frame 930 is submerged under the second fluid 70. Additionally, other mechanisms could be employed to achieve the downward and upward movements of the bodies described herein.

I claim:

1. A variable volumetric body for use submerged in a second fluid comprising:
   a. a floatation device located at a proximal end of said variable volumetric body, said floatation device configured to create a desired floatation force;
   b. a weight device located at a distal end of said variable volumetric body, said weight device configured to create a desired weight force, said proximal and distal ends of said variable volumetric body being oriented on an axis;
   c. a diaphragm connected axially between said floatation device and said weight device, said diaphragm having an interior chamber capable of, in a first sense, moving axially to expand in size to draw in a first fluid having a first fluid density and a first fluid pressure, and in a second sense, moving axially to contract in size to expel out said first fluid; and
   d. a conduit having a first end in fluid communication with said diaphragm interior chamber and a second end in fluid communication with said first fluid to permit passage of said first fluid into or out of said diaphragm interior chamber;
   e. said body being capable of operating submerged within said second fluid, said second fluid having a second fluid density greater than said first fluid density and having a second fluid pressure greater than said first fluid pressure;
   f. said diaphragm being configured to operate under said second fluid pressure so that said diaphragm will not collapse in a direction perpendicular to said axis;

g. said flotation device having a density less than said second fluid density; said weight device having a density greater than said second fluid density; said diaphragm, when receiving said first fluid has an overall density less than said second fluid;

h. said variable volumetric body having an overall density less than that of said second fluid when said first fluid occupies said diaphragm interior chamber;

i. said variable volumetric body having an overall density greater than or equal to that of said second fluid when said first fluid does not occupy said diaphragm interior chamber;

j. said variable volumetric body having a first total body density when in said first sense, and a second overall body density, different from said first body density, when in said second sense;

k. said floatation force being in a substantially upward direction when said variable volumetric body is submerged in said second fluid, said weight force being in a substantially downward direction when said variable volumetric body is submerged in said second fluid, said variable volumetric body proximal end aligned substantially vertically above said variable volumetric body distal end when submerged in said second fluid when said diaphragm is in said expanded first sense, said variable volumetric body proximal end aligned substantially vertically below said variable volumetric body distal end when submerged in said second fluid when said diaphragm is in said contracted second sense.

2. The apparatus of claim 1 wherein the conduit has a valve for regulating flow therethrough.

3. A variable volumetric body for use submerged in a second fluid, said body having a proximal end, a distal end opposite said proximal end, and a vertical axis through its center between said proximal and vertical ends, comprising:

a. a weight device located at said distal end of said body, said weight device configured to create a desired weight force and being in a substantially downward direction when said body is submerged in said second fluid;

b. a diaphragm having a top end connected to said weight device along said body axis, a bottom end opposite said top end, an interior chamber capable of, in a first sense, moving axially to expand in size to draw in a first fluid having a first fluid density and a first fluid pressure, and in a second sense, moving axially to contract in size to expel out said first fluid, said diaphragm configured to create a desired buoyant force in a substantially upward direction when said diaphragm is in said expanded sense and said body is submerged in said second fluid; and c. a conduit having a first end in fluid communication with said diaphragm interior chamber and a second end in fluid communication with said first fluid to permit passage of said first fluid into or out of said diaphragm interior chamber;

d. said body being capable of operating submerged within said second fluid, said second fluid having a second fluid density greater than said first fluid density and having a second fluid pressure greater than said first fluid pressure;

e. said diaphragm being configured to operate under said second fluid pressure so that said diaphragm will not collapse in a direction perpendicular to said body axis;

f. said weight device having a density greater than said second fluid density; said diaphragm, when receiving said first fluid having an overall density less than said second fluid;

g. said body having an overall density less than that of said second fluid when said first fluid occupies said diaphragm interior chamber;

h. said body having an overall density greater than or equal to that of said second fluid when said first fluid does not occupy said diaphragm interior chamber;

i. said body having a first total body density when in said first sense, and a second overall body density, different from said first body density, when in said second sense;

j. said variable volumetric body proximal end aligned substantially vertically above said variable volumetric body distal end when submerged in said second fluid when said diaphragm is in said expanded first sense, said variable volumetric body proximal end aligned substantially vertically below said variable volumetric body distal end when submerged in said second fluid when said diaphragm is in said contracted second sense.

4. A variable volumetric body for use submerged in a second fluid, said body having a proximal end, a distal end opposite said proximal end, and a vertical axis through its center between said proximal and vertical ends, comprising:

a. a floatation device located at said proximal end of said body, said floatation device configured to create a desired floatation force and being in a substantially upward direction when said body is submerged in said second fluid;

b. a diaphragm having a top end connected to said floatation device along said body axis, a bottom end opposite said top end, an interior chamber capable of, in a first sense, moving axially to expand in size to draw in a first fluid having a first fluid density and a first fluid pressure, and in a second sense, moving axially to contract in size to expel out said first fluid; and c. a conduit having a first end in fluid communication with said diaphragm interior chamber and a second end in fluid communication with said first fluid to permit passage of said first fluid into or out of said diaphragm interior chamber;

d. said body being capable of operating within a second fluid having a second fluid density greater than said first fluid density and having a second fluid pressure greater than said first fluid pressure;

e. said diaphragm being configured to operate under said second fluid pressure so that said diaphragm will not collapse in a direction perpendicular to said body axis;

f. said flotation device having a density less than said second fluid density; said diaphragm, when receiving said first fluid having an overall density less than said second fluid;

g. said body having an overall density less than that of said second fluid when said first fluid occupies said diaphragm interior chamber;

h. said body having an overall density greater than or equal to that of said second fluid when said first fluid does not occupy said diaphragm interior chamber;

i. said body having a first overall body density when in said first sense, and a second overall body density, different from said first body density, when in said second sense;

j. said variable volumetric body proximal end aligned substantially vertically above said variable volumetric body distal end when submerged in said second fluid when said diaphragm is in said expanded first sense, said variable volumetric body proximal end aligned substantially vertically below said variable volumetric body distal end when submerged in said second fluid when said diaphragm is in said contracted second sense.

5. A submersible apparatus for creating rotational movement or work comprising:
 a. plurality of variable volumetric bodies each comprising
  i. a floatation device located at a proximal end of said variable volumetric body, said floatation device configured to create a desired floatation force;
  ii. a weight device located at a distal end of said variable volumetric body, said weight device configured to create a desired weight force, said proximal and distal ends of said variable volumetric body being oriented on an axis;
  iii. a diaphragm connected axially between said floatation device and said weight device, said diaphragm having an interior chamber capable of in a first sense, moving axially to expand in size to draw in a first fluid having a first fluid density and a first fluid pressure, and in a second sense, moving axially to contract in size to expel out said first fluid; and
  iv. a conduit having a first end in fluid communication with said diaphragm interior chamber and a second end in fluid communication with said first fluid to permit passage of said first fluid into or out of said diaphragm interior chamber;
  v. said variable volumetric bodies being capable of operating submerged within a second fluid having a second fluid density greater than said first fluid density and having a second fluid pressure greater than said first fluid pressure;
  vi. said diaphragm being configured to operate under said second fluid pressure so that said diaphragm will not collapse in a direction perpendicular to said axis;
  vii. said flotation device having a density less than said second fluid density, said weight device having a density greater than said second fluid density, said diaphragm, when receiving said first fluid has an overall density less than said second fluid;
  viii. said variable volumetric body having an overall density less than that of said second fluid when said first fluid occupies said diaphragm interior chamber;
  ix. said variable volumetric body having an overall density greater than or equal to that of said second fluid when said first fluid does not occupy said diaphragm interior chamber;
  x. said variable volumetric body having a first overall body density when in said first sense, and a second overall body density, different from said first body density, when in said second sense;
  xi. said floatation force being in a substantially upward direction when said variable volumetric body is submerged in said second fluid, said weight force being in a substantially downward direction when said variable volumetric body is submerged in said second fluid, said variable volumetric body proximal end aligned substantially vertically above said variable volumetric body distal end when submerged in said second fluid when said diaphragm is in said expanded first sense, said variable volumetric body proximal end aligned substantially vertically below said variable volumetric body distal end when submerged in said second fluid when said diaphragm is in said contracted second sense;
 b. an axel, having a first axel end and a second axel end opposite said first end, capable of being oriented in a substantially horizontal plane within said second fluid, said axel capable of 360 degrees of rotation to create a path of rotation in a first direction, said axel also capable of being attached to a desired drive train for transmitting the rotation of said axel to another device, said axel being supported at said first axel end and/or said second axel end;
 c. a frame fixedly and substantially perpendicularly connected around said axel and oriented to create a circumferential surface at a desired radial distance from said axel for receiving said plurality of variable volumetric bodies; said circumferential surface having a maxima point of reference at its highest vertical position relative to said axel and a minima point of reference opposite said maxima point of reference at its lowest vertical position relative to said axel, said variable volumetric bodies being mounted to and oriented about said circumferential surface so that the distal end of one of said variable volumetric bodies faces the proximal end of an adjacent one of said variable volumetric bodies all in a spaced relation at said radial distance from said axel, said proximal ends of each of said variable volumetric bodies facing said first direction, said distal ends of each of said variable volumetric bodies facing the opposite of said first direction;
  said frame having a zone of contraction located between said maxima point and said minima point along said path of rotation in said first direction; said frame having a zone of expansion located between said minima point and said maxima point along said path of rotation in said first direction;
  said variable volumetric bodies being capable of moving into said first sense when said variable volumetric bodies pass through said zone of expansion, said expansion being attributable to a substantially upward movement of said flotation device along said axis and a substantially vertical downward movement of said weight device along said axis;
  said variable volumetric bodies being capable of moving into said second sense when said variable volumetric bodies pass through said zone of contraction, said contraction being attributable to a substantially vertical upward movement of said flotation device along said axis and a substantially vertical downward movement of said weight device along said axis; and
 d. a foundation structure for holding said apparatus in a desired location submerged in said second fluid.

6. The apparatus of claim 5 wherein said variable volumetric bodies are spaced apart equally about said circumferential surface.

7. The apparatus of claim 5 wherein the access of said first fluid into or out of said conduit is regulated by a valve.

8. The apparatus of claim 5 wherein said frame has a hollow core, said first fluid is in fluid communication with said hollow core, and said body conduit is in fluid communication with such hollow core.

9. A method for creating rotational movement or work comprising the steps of:
 a. providing a submersible apparatus comprising:
  i. a plurality of variable volumetric bodies each comprising
   a floatation device located at a proximal end of said variable volumetric body, said floatation device configured to create a desired floatation force;
   a weight device located at a distal end of said variable volumetric body, said weight device configured to create a desired weight force, said proximal and distal ends of said variable volumetric body being oriented on an axis;
   a diaphragm connected axially between said floatation device and said weight device, said diaphragm having an interior chamber capable of in a first sense, moving axially to expand in size to draw in a first fluid having a first fluid density and a first fluid pressure, and in a second sense, moving axially to contract in size to expel out said first fluid; and a conduit having a first end in fluid communication with said diaphragm interior chamber and a second end in fluid communication with said first fluid to permit passage of said first fluid into or out of said diaphragm interior chamber;

said variable volumetric bodies being capable of operating within a second fluid having a second fluid density greater than said first fluid density and having a second fluid pressure greater than said first fluid pressure;

said diaphragm being configured to operate under said second fluid pressure so that said diaphragm will not collapse in a direction perpendicular to said axis;

said flotation device having a density less than said second fluid density, said weight device having a density greater than said second fluid density, said diaphragm, when receiving said first fluid has an overall density less than said second fluid;

said variable volumetric body having an overall density less than that of said second fluid when said first fluid occupies said diaphragm interior chamber;

said variable volumetric body having an overall density greater than or equal to that of said second fluid when said first fluid does not occupy said diaphragm interior chamber;

said variable volumetric body having a first overall body density when in said first sense, and a second overall body density, different from said first body density, when in said second sense;

said floatation force being in a substantially upward direction when said variable volumetric body is submerged in said second fluid, said weight force being in a substantially downward direction when said variable volumetric body is submerged in said second fluid, said variable volumetric body proximal end aligned substantially vertically above said variable volumetric body distal end when submerged in said second fluid when said diaphragm is in said expanded first sense, said variable volumetric body proximal end aligned substantially vertically below said variable volumetric body distal end when submerged in said second fluid when said diaphragm is in said contracted second sense;

ii. an axel, having a first axel end and a second axel end opposite said first end, capable of being oriented in a substantially horizontal plane within said second fluid, said axel capable of 360 degrees of rotation to create a path of rotation in a first direction, said axel also capable of being attached to a desired drive train for transmitting the rotation of said axel to another device, said axel being supported at said first axel end and/or said second axel end;

iii. a frame fixedly and substantially perpendicularly connected around said axel and oriented to create a circumferential surface at a desired radial distance from said axel for receiving said variable volumetric bodies; said circumferential surface having a maxima point at its highest vertical position relative to said axel and a minima point at its lowest vertical position relative to said axel, said variable volumetric bodies being mounted to and oriented about said circumferential surface so that the distal end of one of said variable volumetric bodies faces the proximal end of an adjacent one of said variable volumetric bodies all in a spaced relation at said radial distance from said axel, said proximal ends of each of said variable volumetric bodies facing said first direction, said distal ends of each of said variable volumetric bodies facing the opposite of said first direction;

said frame having a zone of contraction located between said maxima point and said minima point along said path of rotation in said first direction; said frame having a zone of expansion located between said minima point and said maxima point along said path of rotation in said first direction;

said variable volumetric bodies expanding in said first sense when said variable volumetric bodies pass through said zone of expansion, said expansion being attributable to a substantially upward movement of said flotation device along said axis and a substantially vertical downward movement of said weight device along said axis;

said variable volumetric bodies compressing in said second sense when said variable volumetric bodies pass through said zone of contraction, said contraction being attributable to a substantially vertical upward movement of said flotation device along said axis and a substantially vertical downward movement of said weight device along said axis; and iv. a foundation structure for holding said apparatus in a desired location submerged in said second fluid;

b. introducing said second end of said conduit to said first fluid;

c. introducing said apparatus into said second fluid while maintaining the second end of said conduit in fluid communication with said first fluid;

d. coupling said axel to a desired drive train; and e. rotating said frame about said axel by contracting said diaphragms of those of said plurality of variable volumetric bodies that are in the zone of contraction while substantially simultaneously expanding said diaphragms of those of said plurality of variable volumetric bodies that are in said zone of expansion.

10. The method of claim 9 comprising the additional step of regulating the speed of rotation by opening or closing a valve connected to the conduit.

11. A submersible apparatus for creating rotational movement or work comprising:

a. plurality of variable volumetric bodies each comprising
  i. a floatation device located at a proximal end of said variable volumetric body, said floatation device configured to create a desired floatation force;
  ii. a weight device located at a distal end of said variable volumetric body, said weight device configured to create a desired weight force, said proximal and distal ends of said variable volumetric body being oriented on an axis;
  iii. a diaphragm connected axially between said floatation device and said weight device, said diaphragm having an interior chamber capable of in a first sense, moving axially to expand in size to rcccivcdraw in a first fluid having a first fluid density and a first fluid pressure, and in a second sense, moving axially to contract in size to expel out said first fluid; and
  iv. a conduit having a first end in fluid communication with said diaphragm interior chamber and a second end in fluid communication with said first fluid to permit passage of said first fluid into or out of said diaphragm interior chamber;

v. said variable volumetric bodies being capable of operating within a second fluid having a second fluid density greater than said first fluid density and having a second fluid pressure greater than said first fluid pressure;

vi. said diaphragm being configured to operate under said second fluid pressure so that said diaphragm will not collapse in a direction perpendicular to said axis;

vii. said flotation device having a density less than said second fluid density, said weight device having a density greater than said second fluid density, said diaphragm, when receiving said first fluid has an overall density less than said second fluid;

viii. said variable volumetric body having an overall density less than that of said second fluid when said first fluid occupies said diaphragm interior chamber;

ix. said variable volumetric body having an overall density greater than or equal to that of said second fluid when said first fluid does not occupy said diaphragm interior chamber;

x. said variable volumetric body having a first overall body density when in said first sense, and a second overall body density, different from said first body density, when in said second sense;

xi. said floatation force being in a substantially upward direction when said variable volumetric body is submerged in said second fluid, said weight force being in a substantially downward direction when said variable volumetric body is submerged in said second fluid, said variable volumetric body proximal end aligned substantially vertically above said variable volumetric body distal end when submerged in said second fluid when said diaphragm is in said expanded first sense, said variable volumetric body proximal end aligned substantially vertically below said variable volumetric body distal end when submerged in said second fluid when said diaphragm is in said contracted second sense;

b. a first axel, having a first axel end and a second axel end opposite said first end, capable of being oriented substantially horizontally within said second fluid, said first axel capable of 360 degrees of rotation to create a path of rotational movement in a first direction;

c. a second axel, having a first axel end and a second axel end opposite said first end, also capable of 360 degrees of rotational movement in said first direction, said second axel being aligned substantially vertically below and substantially parallel with said first axel;

said first axel and/or said second axel also capable of being attached to a desired drive train for transmitting the rotation of said first axel and/or said second axel to another device, said first axel and said second axel being supported at said their respective first axel ends and/or said second axel ends;

d. a first frame fixedly and substantially perpendicularly connected around said first axel and oriented to create a first circumferential surface at a desired first radial distance from said first axel;

e. a second frame fixedly and substantially perpendicularly connected around said second axel and oriented to create a second circumferential surface at a desired second radial distance from said second axel;

said first axel being spaced apart from said second axel by at least the combined length of said first radial distance and said second radial distance so that the movement of said first frame about said first axel will not interfere with the movement of said second frame about said second axel;

f. a belt, for receiving said plurality of variable volumetric bodies, connecting said first frame to said second frame, said belt being located around said first and said second circumferential surfaces to synchronize the rotational movement of said first frame about said first axel with the rotational movement of said second frame about said second axel;

said first circumferential surface having a maxima point of reference at its highest vertical position relative to said first axel; said second circumferential surface having and a minima point of reference at its lowest vertical position relative to said second axel;

said variable volumetric bodies being mounted to and oriented about said belt so that the distal end of one of said variable volumetric bodies faces the proximal end of an adjacent one of said variable volumetric bodies all in a spaced relation, said proximal ends of each of said variable volumetric bodies facing said first direction, said distal ends of each of said variable volumetric bodies facing the opposite of said first direction;

said apparatus having a zone of contraction located between said maxima point and said minima point along said path of rotation in said first direction; said frame having a zone of expansion located between said minima point and said maxima point along said path of rotation in said first direction;

said variable volumetric bodies capable of moving into said first sense when said variable volumetric bodies pass through said zone of expansion, said expansion being attributable to a substantially upward movement of said flotation device along said axis and a substantially vertical downward movement of said weight device along said axis;

said variable volumetric bodies capable of moving into said second sense when said variable volumetric bodies pass through said zone of contraction, said contraction being attributable to a substantially vertical upward movement of said flotation device along said axis and a substantially vertical downward movement of said weight device along said axis; and g. a foundation structure for holding said apparatus in a desired location submerged in said second fluid.

12. The apparatus of claim 11 wherein said first and second radial distances are equal.

13. The apparatus of claim 11 wherein said first and second frames are substantially identical.

14. The apparatus of claim 11 wherein said first and second frames have a hollow core in fluid communication with said first fluid, contain a plurality of spaced valves, and said body conduits of said variable volumetric bodies obtain fluid communication with said core by use of temporary mating of one of said spaced valves with a conduit valve attached to said variable volumetric body conduit.

15. A method for creating rotational movement or work comprising the steps of:

A. providing an apparatus comprising
   a. plurality of variable volumetric bodies each comprising
      i. floatation device located at a proximal end of said variable volumetric body, said floatation device configured to create a desired floatation force;

ii. weight device located at a distal end of said variable volumetric body, said weight device configured to create a desired weight force, said proximal and distal ends of said variable volumetric body being oriented on an axis;

iii. a diaphragm connected axially between said floatation device and said weight device, said diaphragm having an interior chamber capable of in a first sense, moving axially to expand in size to draw in a first fluid having a first fluid density and a first fluid pressure, and in a second sense, moving axially to contract in size to expel out said first fluid; and iv. a conduit having a first end in fluid communication with said diaphragm interior chamber and a second end in fluid communication with said first fluid to permit passage of said first fluid into or out of said diaphragm interior chamber;

v. said variable volumetric bodies being capable of operating within a second fluid having a second fluid density greater than said first fluid density and having a second fluid pressure greater than said first fluid pressure;

vi. said diaphragm being configured to operate under said second fluid pressure so that said diaphragm will not collapse in a direction perpendicular to said axis;

vii. said flotation device having a density less than said second fluid density, said weight device having a density greater than said second fluid density, said diaphragm, when receiving said first fluid has an overall density less than said second fluid;

viii. said variable volumetric body having an overall density less than that of said second fluid when said first fluid occupies said diaphragm interior chamber;

ix. said variable volumetric body having an overall density greater than or equal to that of said second fluid when said first fluid does not occupy said diaphragm interior chamber;

x. said variable volumetric body having a first overall body density when in said first sense, and a second overall body density, different from said first body density, when in said second sense;

xi. said floatation force being in a substantially upward direction when said variable volumetric body is submerged in said second fluid, said weight force being in a substantially downward direction when said variable volumetric body is submerged in said second fluid, said variable volumetric body proximal end aligned substantially vertically above said variable volumetric body distal end when submerged in said second fluid when said diaphragm is in said expanded first sense, said variable volumetric body proximal end aligned substantially vertically below said variable volumetric body distal end when submerged in said second fluid when said diaphragm is in said contracted second sense;

b. a first axel, having a first axel end and a second axel end opposite said first end, capable of being oriented substantially horizontally within said second fluid, said first axel capable of 360 degrees of rotation to create a path of rotational movement in a first direction;

c. a second axel, having a first axel end and a second axel end opposite said first end, also capable of 360 degrees of rotational movement in said first direction, said second axel being aligned substantially vertically below and substantially parallel with said first axel; said first axel and/or said second axel also capable of being attached to a desired drive train for transmitting the rotation of said first axel and/or said second axel to another device, said first axel and said second axel being supported at said their respective first axel ends and/or said second axel ends;

d. a first frame fixedly and substantially perpendicularly connected around said first axel and oriented to create a first circumferential surface at a desired first radial distance from said first axel;

e. a second frame fixedly and substantially perpendicularly connected around said second axel and oriented to create a second circumferential surface at a desired second radial distance from said second axel;

said first axel being spaced apart from said second axel by at least the combined length of said first radial distance and said second radial distance so that the movement of said first frame about said first axel will not interfere with the movement of said second frame about said second axel;

f. a belt, for receiving said plurality of variable volumetric bodies, connecting said first frame to said second frame, said belt being located around said first and said second circumferential surfaces to synchronize the rotational movement of said first frame about said first axel with the rotational movement of said second frame about said second axel;

said first circumferential surface having a maxima point of reference at its highest vertical position relative to said first axel; said second circumferential surface having and a minima point of reference at its lowest vertical position relative to said second axel;

said variable volumetric bodies being mounted to and oriented about said belt so that the distal end of one of said variable volumetric bodies faces the proximal end of an adjacent one of said variable volumetric bodies all in a spaced relation, said proximal ends of each of said variable volumetric bodies facing said first direction, said distal ends of each of said variable volumetric bodies facing the opposite of said first direction;

said apparatus having a zone of contraction located between said maxima point and said minima point along said path of rotation in said first direction; said frame having a zone of expansion located between said minima point and said maxima point along said path of rotation in said first direction;

said variable volumetric bodies capable of moving into said first sense when said variable volumetric bodies pass through said zone of expansion, said expansion being attributable to a substantially upward movement of said flotation device along said axis and a substantially vertical downward movement of said weight device along said axis;

said variable volumetric bodies capable of moving into said second sense when said variable volumetric bodies pass through said zone of contraction, said contraction being attributable to a substantially vertical upward movement of said flotation device along said axis and a substantially vertical downward movement of said weight device along said axis; and g. a foundation structure for holding said apparatus in a desired location submerged in said second fluid;

B. surrounding said apparatus with said second fluid while maintaining said first end of said variable volumetric body conduit in fluid communication with said first fluid;

C. coupling said first axel and/or said second axel to a desired drive chain; and D. rotating said first frame and said second frame about said first axel and said second axel respectively by the contraction of said diaphragms of those of said plurality of variable volumetric bodies that are in the zone of contraction and the substantially simultaneous expansion of said diaphragms of those of said plurality of variable volumetric bodies that are in said zone of expansion.

16. The method of claim 9 comprising the additional step of:

f. transmitting the rotation of said axel to said another device to capture the rotational movement or work.

17. The method of claim 15 comprising the additional step of:

E. transmitting the rotation of said first axel or said second axel to said another device to capture the rotational movement or work.

18. The apparatus of claim 1 wherein said first fluid comprises air and said second fluid comprises water.

19. The apparatus of claim 5 wherein said first fluid comprises air and said second fluid comprises water.

20. The apparatus of claim 11 wherein said first fluid comprises air and said second fluid comprises water.

* * * * *